United States Patent
Ohta

(10) Patent No.: US 8,594,049 B2
(45) Date of Patent: Nov. 26, 2013

(54) WIRELESS COMMUNICATION SYSTEM, BASE STATION, MOBILE STATION, AND METHOD FOR DETERMINING TRANSMISSION PARAMETER

(75) Inventor: Daisuke Ohta, Tokyo (JP)

(73) Assignee: NEC Corporation, Tokyo (JP)

( * ) Notice: Subject to any disclaimer, the term of this patent is extended or adjusted under 35 U.S.C. 154(b) by 379 days.

(21) Appl. No.: 12/735,991

(22) PCT Filed: Mar. 31, 2009

(86) PCT No.: PCT/JP2009/056588
§ 371 (c)(1),
(2), (4) Date: Aug. 31, 2010

(87) PCT Pub. No.: WO2009/123163
PCT Pub. Date: Oct. 8, 2009

(65) Prior Publication Data
US 2010/0322202 A1    Dec. 23, 2010

(30) Foreign Application Priority Data

Mar. 31, 2008  (JP) ................. 2008-091748

(51) Int. Cl.
*H04W 4/00*  (2009.01)
(52) U.S. Cl.
USPC ........................................... 370/332
(58) Field of Classification Search
USPC .................. 370/252, 254, 310, 328, 331, 332
See application file for complete search history.

(56) References Cited

U.S. PATENT DOCUMENTS

| | | |
|---|---|---|
| 2005/0047259 A1 | 3/2005 | Ahn et al. |
| 2005/0265222 A1 | 12/2005 | Gerlach |

(Continued)

FOREIGN PATENT DOCUMENTS

| | | |
|---|---|---|
| CN | 101053269 A | 10/2007 |
| CN | 101110687 A | 1/2008 |

(Continued)

OTHER PUBLICATIONS

Ofuji, et al., "Effect of Fast Packet Scheduling Method in Frequency Domain Considering Delay Requirements in Forward Link for Spread OFDM Broadband Wireless Packet Access",Journal Title;IEIC Technical Report (Institute of Electronics, Information and Communication Engineers) Journal Code:S0532B, ISSN:0913-5685, vol. 104;No. 598(RCS2004 259-289);p. 101-106(2006), Japan.

(Continued)

*Primary Examiner* — Chirag Shah
*Assistant Examiner* — Jenkey Van
(74) *Attorney, Agent, or Firm* — McGinn IP Law Group, PLLC

(57) ABSTRACT

A wireless communication system comprises a base station, wherein the base station performs scheduling for determining a resource block allocated to a mobile station, and determines a downlink transmission parameter based on a reception quality reported from the mobile station. The base station determines a transmission parameter by a predetermined first method for determining a transmission parameter when an identical resource block as a resource block allocated to any mobile station is allocated in an area adjacent to an area to which the mobile station is connecting, and determines a transmission parameter by a second method for determining a transmission parameter which selects a transmission parameter having a transmitting efficiency equal to or more than that by the first method for determining a transmission parameter when an identical resource block as a resource block allocated to any mobile station is not allocated in an area adjacent to an area to which the mobile station is connecting.

16 Claims, 20 Drawing Sheets

(56) References Cited

U.S. PATENT DOCUMENTS

| | | |
|---|---|---|
| 2006/0014554 A1 | 1/2006 | Gerlach |
| 2007/0082619 A1* | 4/2007 | Zhang et al. ............ 455/69 |
| 2007/0105583 A1 | 5/2007 | Gerlach |
| 2007/0291685 A1 | 12/2007 | Fiat |
| 2007/0298822 A1 | 12/2007 | Wan et al. |
| 2008/0285477 A1 | 11/2008 | Kuroda et al. |
| 2008/0311854 A1* | 12/2008 | Kubo et al. ............ 455/67.11 |

FOREIGN PATENT DOCUMENTS

| | | |
|---|---|---|
| EP | 1 868 332 A2 | 12/2007 |
| JP | 2005-328519 | 11/2005 |
| JP | 2006-33826 | 2/2006 |
| JP | 2006-522503 | 9/2006 |
| JP | 2007-129708 | 5/2007 |
| JP | 2008-48148 | 2/2008 |
| WO | WO 2007/023787 A1 | 3/2007 |
| WO | WO 2007023787 A1 * | 3/2007 |

OTHER PUBLICATIONS

Fujita, et al., "High Throughput Frequency Scheduling Algorithm with Extensive Coverage Area for Cellular Networks Based on OFDMA", IEIC Technical Report (Institute of Electronics, Information and Communication Engineers),Journal Code:S0532B ISSN:0913-5685, Japan, vol. 106, No. 168, pp. 121-125.
3GPP TR 21.905 V8.1.0 (Jun. 2007), Release 8, pp. 8 ("cell") and 23 ("Sector").
3GPP TS 36.300 V8.2.0 (Sep. 2007), Release 8, pp. 51-53.
3GPP TA 36.211 V8.0.0 (Sep. 2007), Release 8, pp. 21-24 and 35-41.
Chinese Office Action dated Aug. 31, 2012, with English translation.

* cited by examiner

WIRELESS COMMUNICATION SYSTEM, BASE STATION, MOBILE STATION, AND METHOD FOR DETERMINING TRANSMISSION PARAMETER

REFERENCE TO RELATED APPLICATION

This application claims the benefit of Japanese Patent Application No. 2008-091748, filed Mar. 31, 2008, which is hereby incorporated herein by reference thereto in its entirety.

TECHNICAL FIELD

The present invention relates to a wireless communication system, a base station, a mobile station, and method for determining transmission parameter, and particularly, to the wireless communication system, the base station, the mobile station, and method for determining transmission parameter in which time-frequency scheduling is performed and downlink transmission parameter is determined based on the reception quality reported from the mobile station.

BACKGROUND

In a wireless communication system such as OFDM (Orthogonal Frequency Division Multiple Access), a base station performs scheduling by considering combination of a time-axis sample and a subcarrier as a unit based on downlink reception quality information reported from each mobile station to improve use efficiency in a frequency domain. A combination of a time-axis sample and a subcarrier is referred to as a resource block (Non-Patent Documents 1, 2). A resource block in 3GPP is defined in Non-Patent Document 4, on pages 22-24.

FIG. 17 is a block diagram showing a configuration of this kind of a wireless communication system. Areas (60), (61) with which base stations (20), (20a) are able to communicate respectively are referred to as cells. Base station (20) also divides cell (60) into areas (50a), (50b) and (50c), and base station (21) divides cell (61) into areas (51a), (51b) and (51c), and these base stations are capable of communicating with each of areas respectively. Each divided area is referred to as a sector (referring to Non-Patent Document 3).

FIG. 18 is a block diagram showing a detailed configuration of mobile station (10) and base station (20) in FIG. 17. It shows a block diagram of constituent components required to perform scheduling resource blocks. Control unit (101) in mobile station (10) outputs a resource block received from the base station to reception quality measurement unit (102), and performs an operation of transmitting the reception quality information outputted from reception quality measurement unit (102) to the base station.

Reception quality measurement unit (102) in mobile station (10) measures a reception quality of a resource block. The reception quality of the resource block is calculated by for example SINR (Signal to Interference and Noise Ratio) (Non-Patent Document 4). SINR of the resource block is calculated from received power in a downlink reference symbol unit (a portion in which a reference signal of the resource block is stored) by using the following Equation (1).

$$SINR_{RB}(B_0, F_n) = \frac{S(B_0, F_n)}{\sum_{m=1}^{M} S(B_m, F_n) + W} \quad (1)$$

M represents a total number of sectors in the whole system except for the sector to which file mobile station is connecting at the moment, $B_m$ represents a sector, and sector $B_0$ at m=0 represents a sector (Serving Cell) to which the mobile station is connecting at the moment, and a sector at m>0 represents an adjacent sector in the identical base station or a sector in the neighboring base station. Mobile station (10) is capable of measuring the received power of the reference symbol unit of the resource block in these sectors $B_0$-$B_M$ (referring to Non-Patent Document 4). $F_n$ represents nth resource block. Furthermore, $SINR_{RB}(B_0,F_n)$ represents received SINR of a signal transmitted from sector $B_0$ in resource block $F_n$, and $S_{RB}(B_m,F_n)$ represents a received power of a signal transmitted from sector $B_m$ in resource block $F_n$. W is a thermal noise power.

Mobile station (10) reports the reception qualities measured for each resource block by the above-mentioned calculation to base station (20) at regular intervals (Non-Patent Document 5, 11.5 CQI Reporting for Scheduling).

Control unit (201) in the base station transmits downlink data or reference symbols to mobile station (10), and informs the reception quality information reported from mobile station (10) to resource allocation unit (202) and MCS judgment unit (203). Control unit (201) in the base station performs an error correction coding and data modulation in response to MCS (Modulation and Channel Coding Scheme) determined by MCS judgment unit (203) based on the reception quality information when transmitting downlink data.

FIG. 19 is an illustration showing a configuration of resource allocation unit (202) in base station (20). Allocation determination unit (2021) in resource allocation unit (202) performs resource block allocation (scheduling) for each mobile station by using reception quality reports of each resource block from mobile station (10).

FIG. 20 is an illustration showing a configuration of MCS judgment unit (203) in base station (20). MCS determination unit (2031) in MCS judgment unit (203) selects MCS having maximum transmission rate, for example where an error rate generated is less than or equal to a desired value, for the reception qualities of the resource blocks allocated to each mobile station based on the allocation of the resource blocks in resource allocation unit (202) and the reception quality information.

It is proposed that the interference between cells in OFDM mobile communication system as mentioned above can be reduced by allocating resource block and resetting MCS in Patent Documents 1-3.

[Patent Document 1] Japanese Patent Kokai Publication No. P2005-328519A
[Patent Document 2] Japanese Patent Kokai Publication No. P2006-33826A
[Patent Document 3] Japanese Patent Kokai Publication No. P2006-522503A
[Non-Patent Document 1] Y. Ofuji, et al., "IEICE Technical Report [Radio Communication Systems (RCS)]", Vol. 104, No. 598, pp. 101-106, 2006
[Non-Patent Document 2] H. Fujita, et al., "IEICE Technical Report [Radio Communication Systems (RCS)]", Vol. 106, No. 168, pp. 121-125, 2006
[Non-Patent Document 3] 3GPP TR 21.905 V8.1.0(2007-06), "Cell" pp. 8, "Sector" pp. 23
[Non-Patent Document 4] 3GPP TR 36.211 V8.0.0(2007-09), pp. 21-24, pp. 36-41
[Non-Patent Document 5] 3GPP TS 36.300 V8.2.0(2007-09), pp. 52

SUMMARY

It should be noted that the content disclosed in Patent Documents 1-3 and Non-Patent Documents 1-5 are herein incorporated by reference thereto in its entirety. The following analyses are given from the standpoint of the present invention. However, despite being capable of transmitting in high efficiency actually, scheduling may cause a reduction of the transmitting efficiency according to the aforementioned technologies. The reason will be described as follows.

The reception quality reported from the mobile station is measured based on the reference symbol unit. However, when the mobile station receives part of user data, the reception quality depends on the results of scheduling in each cell, and changes with the existence of data. When a resource block of a cell is used for data transmission, and the identical resource block of the adjacent cell is not used for data transmission, the reception quality in receiving data is improved than the reported reception quality due to the reduction of the adjacent cell interference. In this situation, since the base station determines MCS based on the reception qualities for each resource block reported from the mobile station, MCS with the lower data transmission rate than the transmission rate available essentially is selected, and hence the transmitting efficiency is reduced.

Particularly, since the propagation losses are nearly equal in an area such as a sector border in the same base station in which the reception quality is reduced, the improved amount of the reception quality is extremely noticeable when data is not transmitted from the adjacent sector. In this situation, since only MCS with the minimum rate is selected, the transmitting efficiency is reduced extremely, and the overall system throughput is reduced as well as the mobile station throughput.

Technologies in Patent Documents 1-3 are also related to the reduction of the adjacent cell interference by allocating the resource blocks and resetting MCS, however, they doesn't overcome the mismatch between the above-mentioned reception quality reported to the base station and the reception quality which can be expected in receiving data.

The present invention has been made under such circumstances mentioned above, and it is an object of the present invention to provide wireless communication system, base station, mobile station, and method for determination of a transmission parameter to determine a transmission parameter by focusing on the difference between the reception quality reported from the mobile station and the reception quality in receiving data practically, and predicting the reception quality in receiving data.

In a first aspect of the present invention, a wireless communication system is provided that performs scheduling for determining a resource block allocated to a mobile station, and determines a downlink transmission parameter based on a reception quality reported from the mobile station. The base station determines a transmission parameter by a predetermined first method for determining a transmission parameter when an identical resource block as a resource block allocated to any mobile station is allocated in an area adjacent to an area to which the mobile station is connecting, and determines a transmission parameter by a second method for determining a transmission parameter which selects a transmission parameter having a transmitting efficiency equal to or more than that by the first method for determining a transmission parameter when an identical resource block as a resource block allocated to any mobile station is not allocated in an area adjacent to an area to which the mobile station is connecting.

In a second aspect of the present invention, a base station in a wireless communication system is provided that performs scheduling for determining a resource block allocated to a mobile station, and determines a downlink transmission parameter based on a reception quality reported from the mobile station. The base station determines a transmission parameter by a predetermined first method for determining a transmission parameter when an identical resource block as a resource block allocated to any mobile station is allocated in an area adjacent to an area to which the mobile station is connecting, and determines a transmission parameter by a second method for determining a transmission parameter, which selects a transmission parameter having a transmitting efficiency equal to or more than that by the first method for determining a transmission parameter when an identical resource block as a resource block allocated to any mobile station is not allocated in an area adjacent to an area to which the mobile station is connecting.

In a third aspect of the present invention, a mobile station is provided that makes the base station to determine a transmission parameter by using a reception quality with removal of a reception quality deterioration amount due to an adjacent area interference when an identical resource block as a resource block allocated is not allocated.

In a fourth aspect of the present invention, a method for determining a transmission parameter in a wireless communication system including a base station is provided that performs scheduling for determining a resource block allocated to a mobile station, and determines a downlink transmission parameter based on a reception quality reported from the mobile station. This method for determining a transmission parameter comprises the following steps: a step measuring a reception quality of a reference symbol transmitted from the base station in the mobile station, and reporting to the base station by the mobile station; a step determining a transmission parameter by a first method for determining a transmission parameter using a reception quality reported from the mobile station in the base station when an identical resource block as a resource block allocated to the mobile station is allocated in an area adjacent to an area to which the mobile station is connecting; a step determining a transmission parameter by a second method for determining a transmission parameter which selects a transmission parameter having a transmitting efficiency equal to or more than that by the first method for determining a transmission parameter when an identical resource block as a resource block allocated to the mobile station is not allocated in the adjacent area. Incidentally, this method invention was tied to a particular apparatus such as a wireless communication system of the first aspect.

The meritorious effects of the present invention are summarized as follows. According to the present invention, a more effective transmission parameter can be determined when there is no adjacent area interference in transmitting data. The reason is that it is configured that the base station knows the allocation state of the resource blocks in the adjacent area, and determines the transmission parameter by the reception quality with removal of the adjacent interference when there is no adjacent area interference.

As for explanations of symbols, refer to the end of the specification.

PREFERRED MODES

Preferred exemplary embodiments of the present invention will now be described in detail with reference to the drawings.

Outline of the Invention

Figure 18:
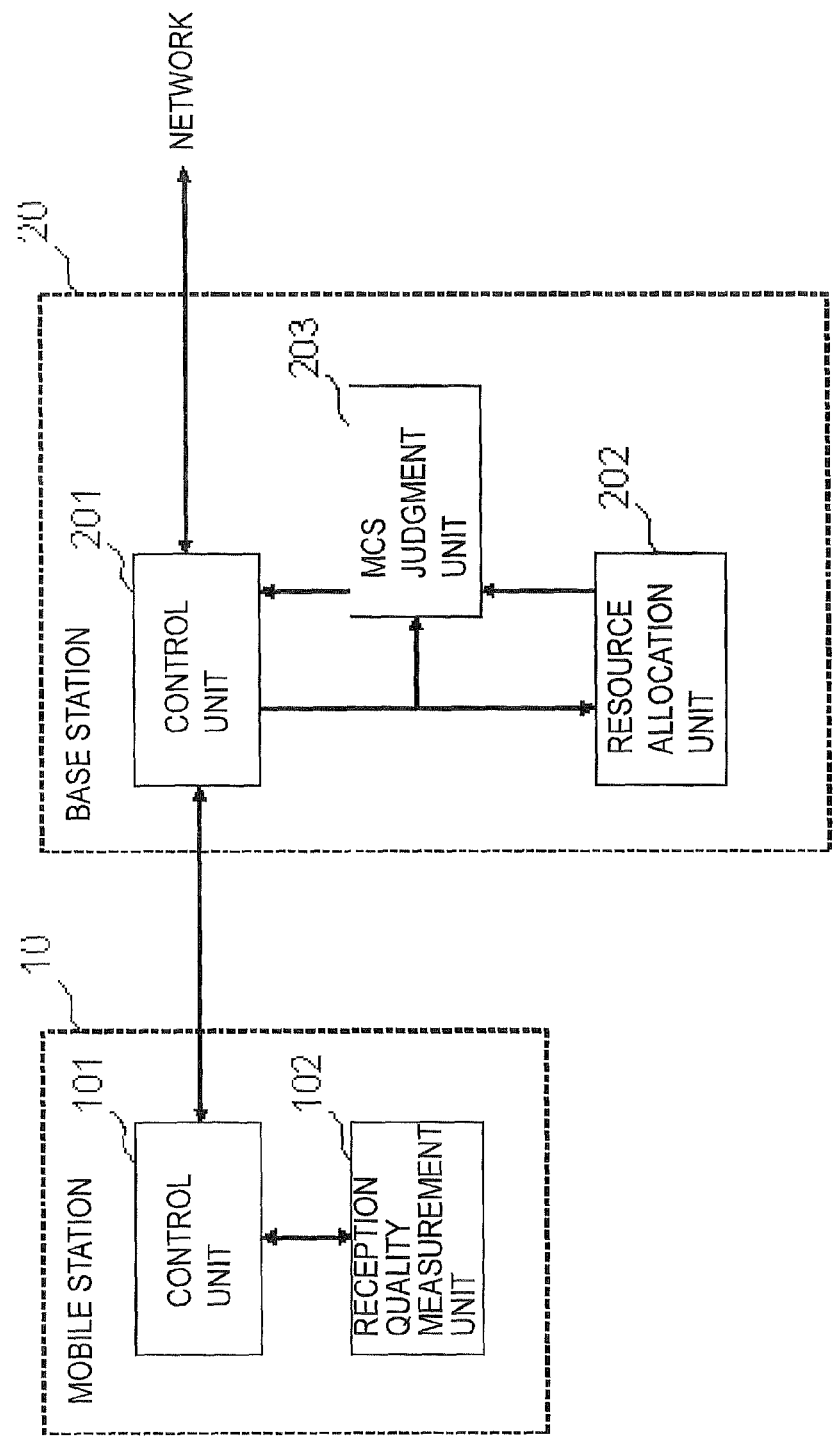
FIG. 18 is a block diagram showing a detailed configuration of a mobile station and a base station in FIG. 17.
Figure 19:
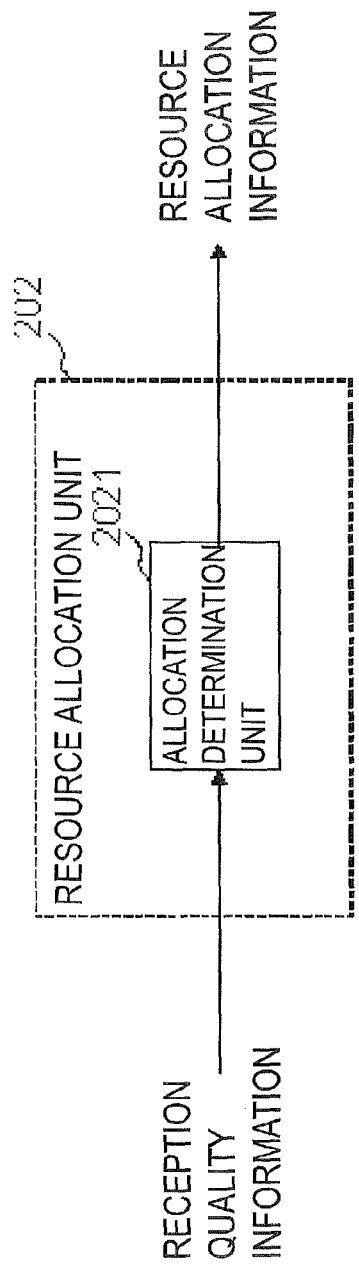
FIG. 19 is an illustration showing a configuration of resource allocation unit in a base station in FIG. 18.
Figure 20:
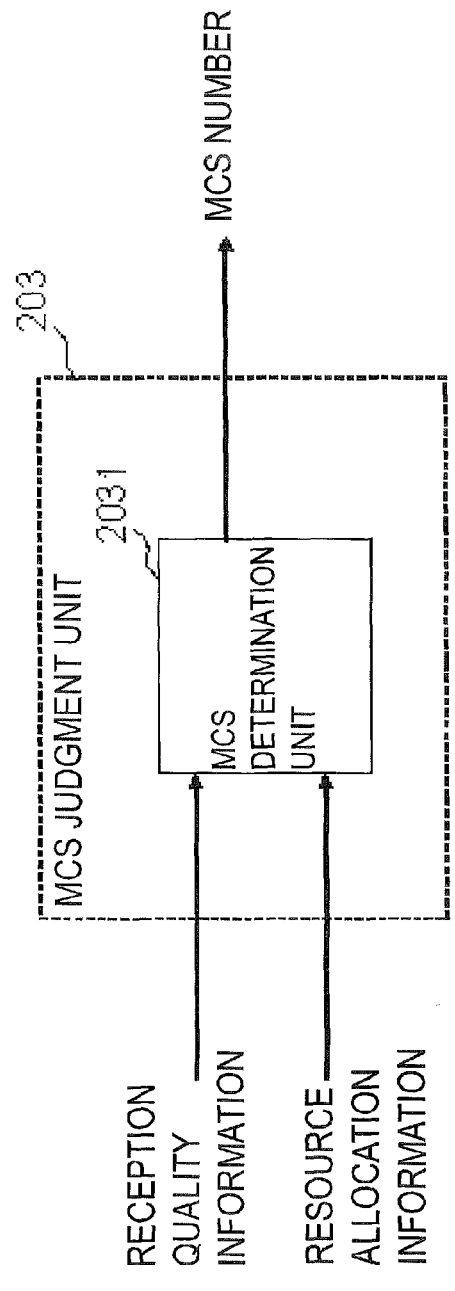
FIG. 20 is an illustration showing a configuration of MCS judgment unit in a base station in FIG. 18.

First, the summary of the invention will be described with reference to FIG. 1. Mobile station (mobile station (11) in FIG. 1) comprises measurement means (a second reception quality measurement unit (113) in FIG. 1) measuring the reception quality of resource blocks with removal of the adjacent cell interference, in addition to the configuration shown in FIG. 18. Control unit (control unit (101) in FIG. 1) in a mobile station (mobile station (11) in FIG. 1) reports reception quality of a resource block without removal of the adjacent cell interference (a first reception quality), and reception quality of a resource block with removal of the adjacent cell interference (a second reception quality) to a base station (base station (21) in FIG. 1).

Figure 1:
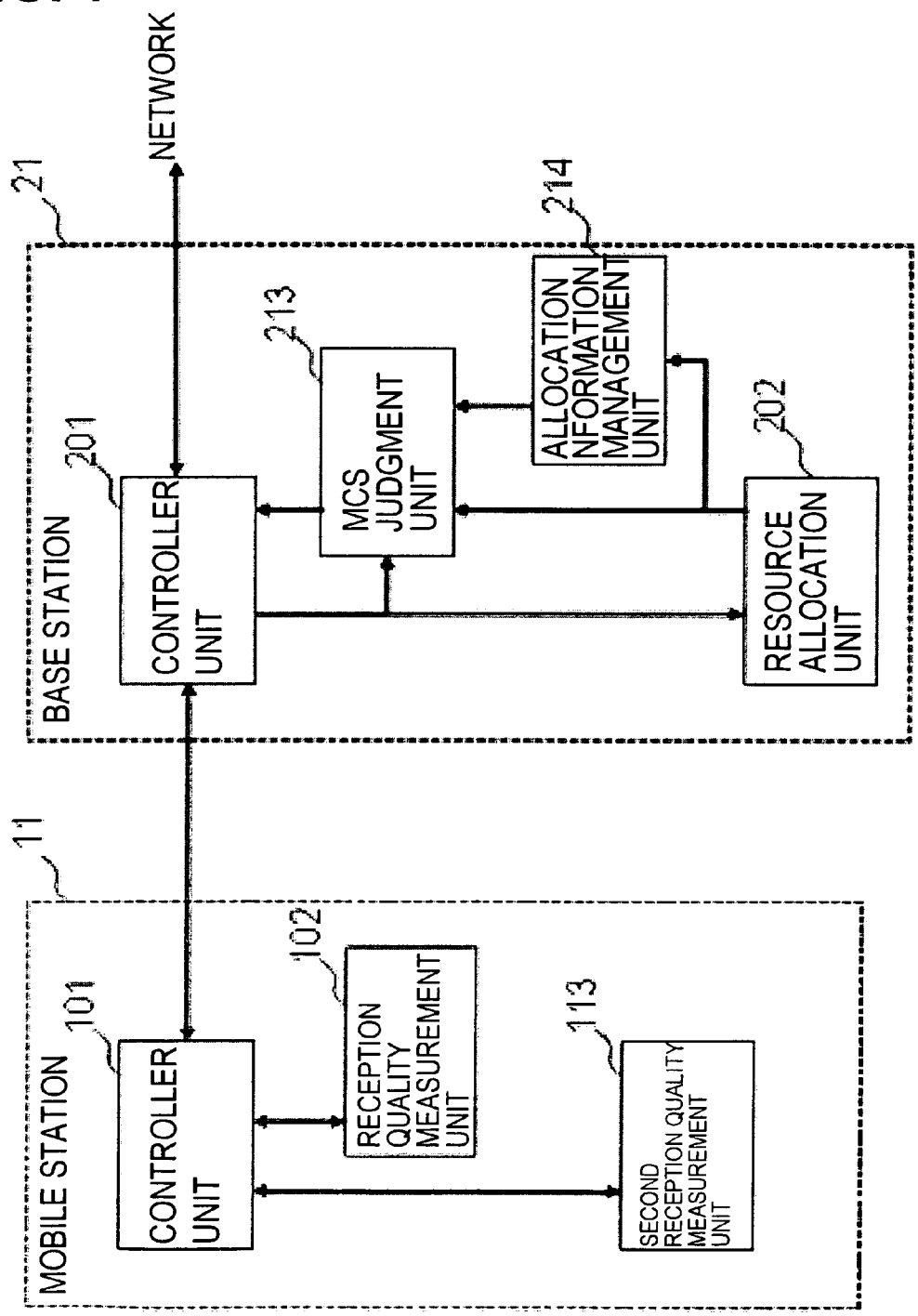
FIG. 1 is a block diagram showing a configuration of a wireless communication system according to a first exemplary embodiment of the invention.
Figure 10:
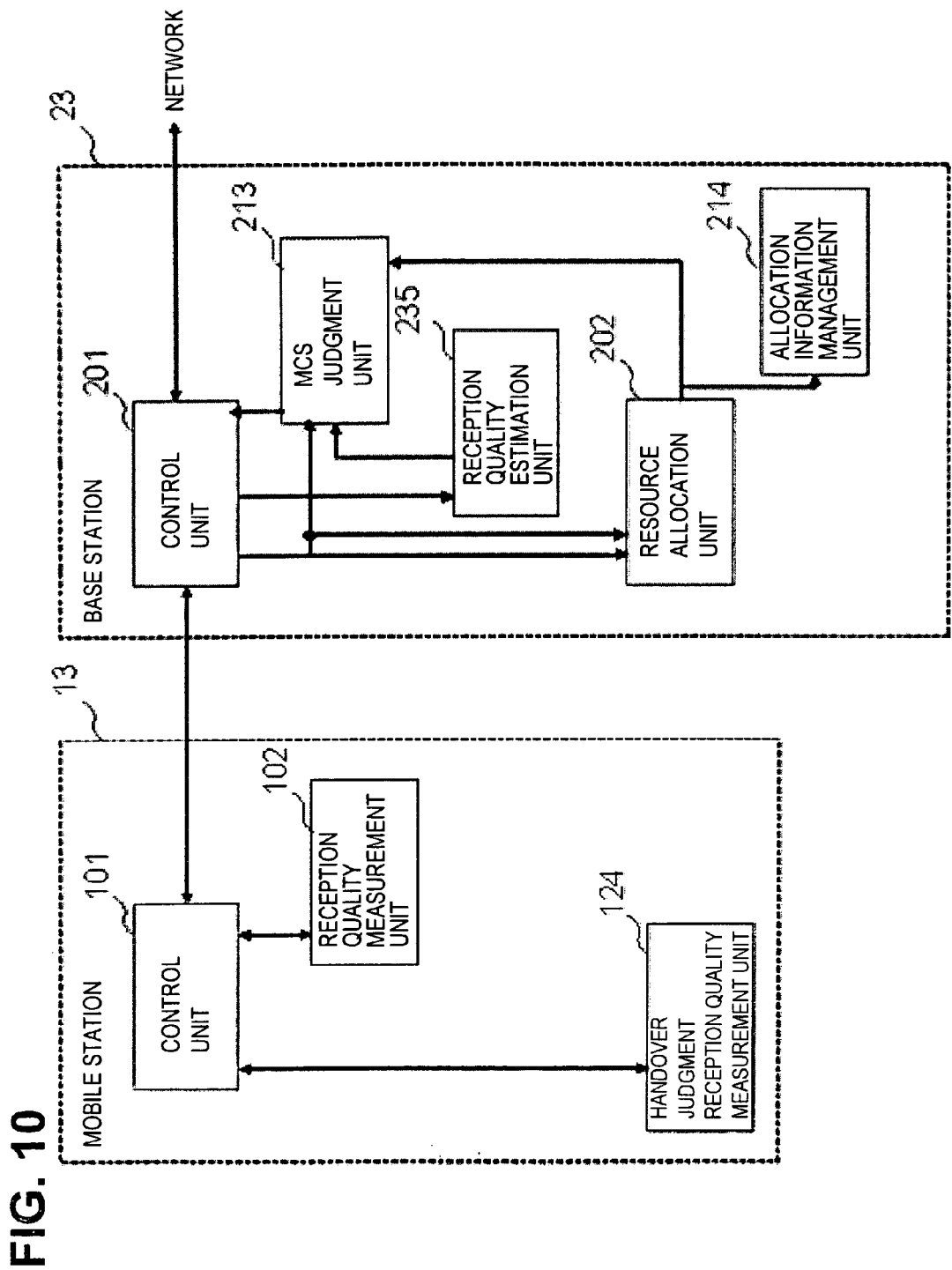
FIG. 10 is a block diagram showing a configuration of a wireless communication system according to a third exemplary embodiment of the invention.

A base station (base station (21) in FIG. 1) comprises management means (management unit of the allocation information (214) in FIG. 1) managing the allocation state of resource blocks of all sectors in the cell of the base station), in addition to the configuration shown in FIG. 10. MCS judgment unit (MCS judgment unit (213) in FIG. 1) in the base station (base station (21) in FIG. 1) refers to the allocation state of resource blocks in all sectors, and determines the transmission parameter (MCS) based on the reception quality of the resource blocks with removal of the adjacent cell interference (a second reception quality) when in the area adjacent to the area whose transmission parameter (MCS) will be determined, the identical resource block as the resource block allocated to the mobile station is not allocated. The transmission parameter (MCS) is determined based on the reception quality reported by the mobile station (a first reception quality) when the identical resource block is used in the adjacent cell.

According to mentioned above, when the adjacent area (the adjacent cell) interference doesn't occur, the transmission parameter (MCS) is raised so that a transmitting efficiency is equal to or more than a transmitting efficiency by the transmission parameter (MCS) obtained from the reception quality reported from the mobile station (a first reception quality).

In the above-mentioned example, it is described that the reception quality of the resource blocks with removal of the adjacent cell interference is measured and reported in the mobile station side, however, it is possible for the base station to calculate the reception quality of the resource blocks with removal of the adjacent cell interference based on the adjacent cell interference reported by the mobile station, or to calculate the reception quality of the resource blocks with removal of the adjacent cell interference by using other information such as handover judgment information. These variated exemplary embodiments will be described in detail in the following each exemplary embodiment of the invention.

First Exemplary Embodiment

A first exemplary embodiment of the invention will be described in detail with reference to the drawings. FIG. 1 is a block diagram showing a configuration of a wireless communication system according to a first exemplary embodiment of the invention. As shown in FIG. 1, mobile station (11) in the first exemplary embodiment of the invention comprises control unit (101), reception quality measurement unit (102), and a second reception quality measurement unit (113).

Control unit (101) in mobile station (11) outputs a resource block received from the base station to reception quality measurement unit (102) and second reception quality measurement unit (113), and performs a transmitting operation to transmit the reception quality information outputted from reception quality measurement unit (102) and second reception quality measurement unit (113) to the base station.

Reception quality measurement unit (102) is means measuring a reception quality of a resource block without consideration of adjacent sector interference (a first reception quality). For example, $SINR_{RB}(B_0, F_n)$ calculated by Equation (1) mentioned in the beginning can be used.

On the other hand, second reception quality measurement unit (113) is means measuring a reception quality of a resource block with removal of adjacent sector interference (a second reception quality). A reception quality of a resource block with removal of adjacent sector interference can be calculated from a received power of reference symbol unit, for example by the following Equation (2).

$$\overline{SINR}_{RB}(B_0, F_n) = \frac{S(B_0, F_n)}{\sum_{m=2}^{M} S(B_m, F_n) + W} \quad (2)$$

Above-mentioned Equation (2) represents received SINR of a signal transmitted from sector $B_0$ with removal of the adjacent sector interference at the resource block Fn. A sector of the same base station having the maximum received power of the resource block calculated in the reference symbol unit among sectors with which the mobile station doesn't communicate is selected as an adjacent sector, and is designated as $B_1$. Mobile station (11) is capable of measuring a received power from sector $B_0$ and adjacent sector $B_1$ in the same manner as in the process of derivation of Equation (1) (referring to Non-Patent Document 4). A denominator of the right hand side of above-mentioned Equation (2) is an addition of a summation of received powers in reference symbol units of sectors $B_2$-$B_M$ excluding the connecting sector $B_0$ and the adjacent sector $B_1$, and thermal noise power W. A numerator of the right hand side of above-mentioned Equation (2) is a received power in a reference symbol unit of sector $B_0$. It is a difference from Equation (1) that the received power of the reference symbol unit from adjacent sector $B_1$ is removed at the denominator of the right hand side. It should be noted that the content disclosed in Non-Patent Document 4 is herein incorporated by reference thereto in its entirety.

Mobile station (11) reports the reception quality of the resource block without consideration of the adjacent sector interference measured in reception quality measurement unit (102) (a first reception quality), and the reception quality of the resource block with removal of the adjacent sector interference measured in second reception quality measurement unit (113) (a second reception quality) to base station (21).

Mobile station (21) comprises control unit (201), resource allocation unit (202), MCS judgment unit (213), and allocation information management unit (214), and determines MCS based on two kinds of the reception quality information and the allocation information of resource blocks in all sectors of the cell of the base station.

Control unit (201) receives both of the first reception quality information and the second reception quality information from mobile station (11), and provides them to resource allocation unit (202) and MCS judgment unit (213). Control unit (201) transmits a downlink data or a reference symbol. Control unit (201) performs error-correction coding and data modulation based on MCS determined in MCS judgment unit (213) in transmitting a downlink data.

Resource allocation unit (202) performs resource allocation separately for each sector of the cell of the base station. Allocation information management unit (214) collects the resource allocation information separately for each sector in the cell of the base station.

MCS judgment unit (213) refers to the resource allocation information in all sectors of the cell of the base station stored in allocation information management unit (214), and determines MCS by judging whether the resource block is used or not in the adjacent sector.

Figure 2:
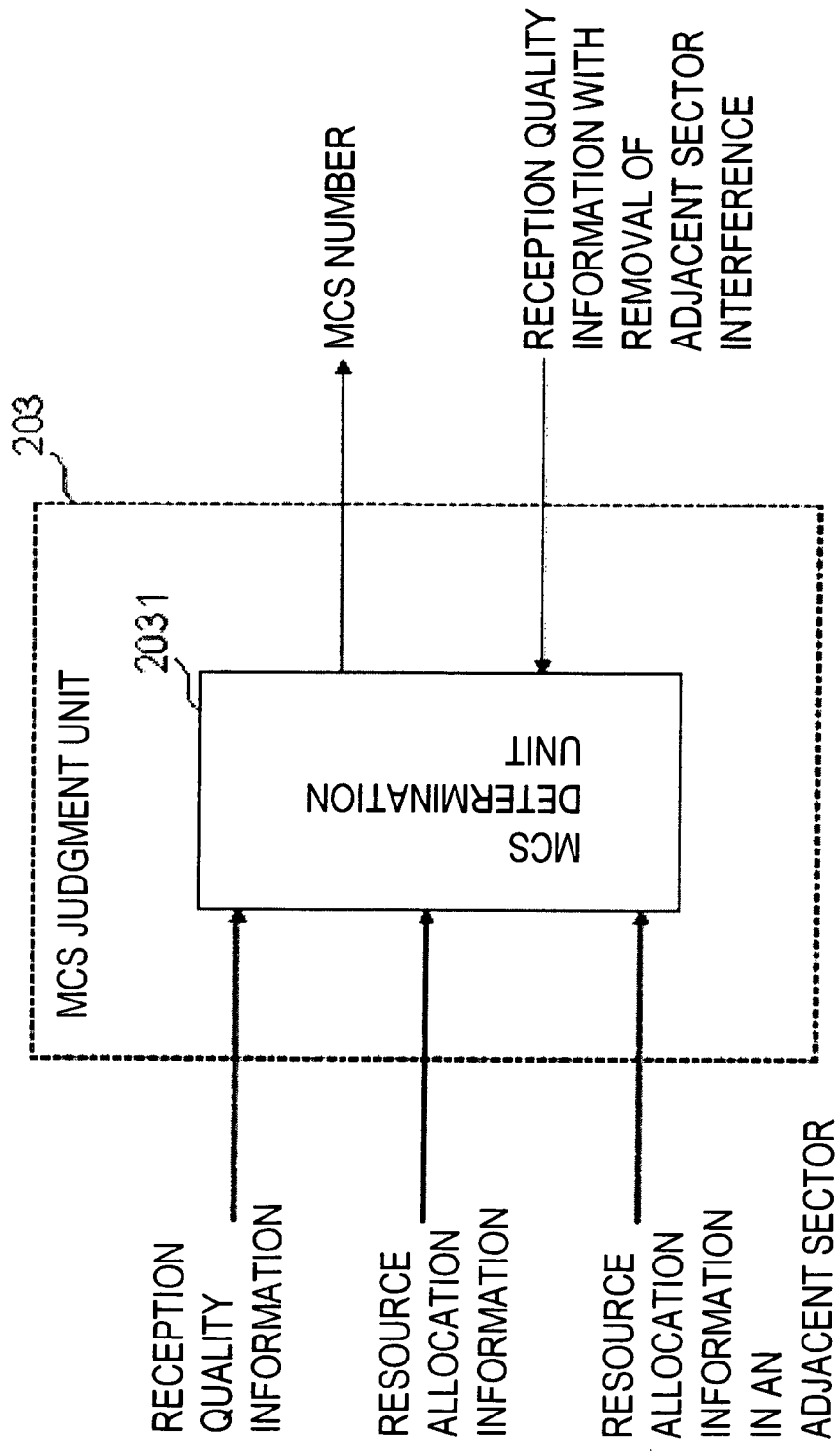
FIG. 2 is a block diagram showing a detailed configuration of MCS judgment unit in a base station according to a first exemplary embodiment of the invention.

FIG. 2 is a block diagram showing a detailed configuration of MCS judgment unit (213) in above-mentioned base station (21). By referring to FIG. 2, MCS determination unit (2031) in MCS judgment unit (213) receives two kinds of reception quality information reported by the above-mentioned mobile station, the resource allocation information in the sector with which the mobile station is connecting, and the resource allocation information of the sector adjacent to the connecting sector as input, and outputs MCS number.

Figure 3:
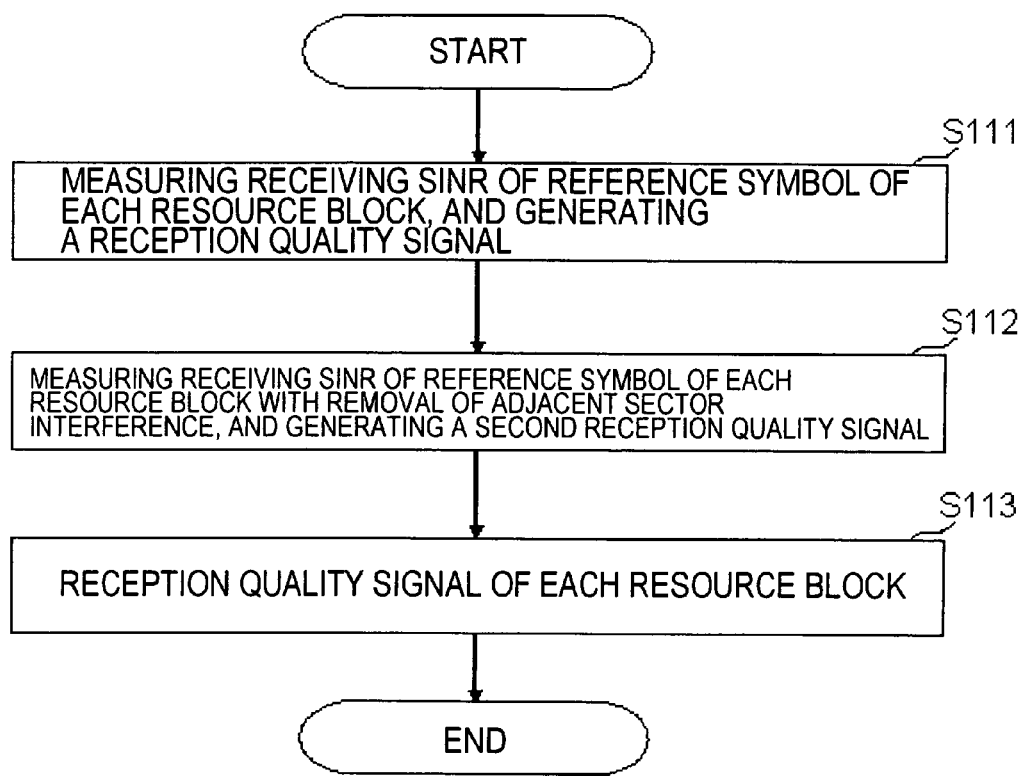
FIG. 3 is a flow chart showing the flow of operation in a reception quality report performed in a mobile station according to a first exemplary embodiment of the invention.

Then the operations of above-mentioned mobile station (11) and base station (21) are described in detail with reference to the drawings. FIG. 3 is a flow chart showing the flow of operation in a reception quality report performed at regular intervals in mobile station (11).

By referring to FIG. 3, firstly, mobile station (11) measures reception qualities of each resource block by reception quality measurement unit (102) that is essential information for base station (21) to perform scheduling (step S111).

Next, mobile station (11) obtains reception qualities with removal of the adjacent sector interference by second reception quality measurement unit (113) (step S112).

Mobile station (11) reports these reception qualities obtained from reception quality measurement unit (102) and second reception quality measurement unit (113) to base station (step S113).

Figure 4:
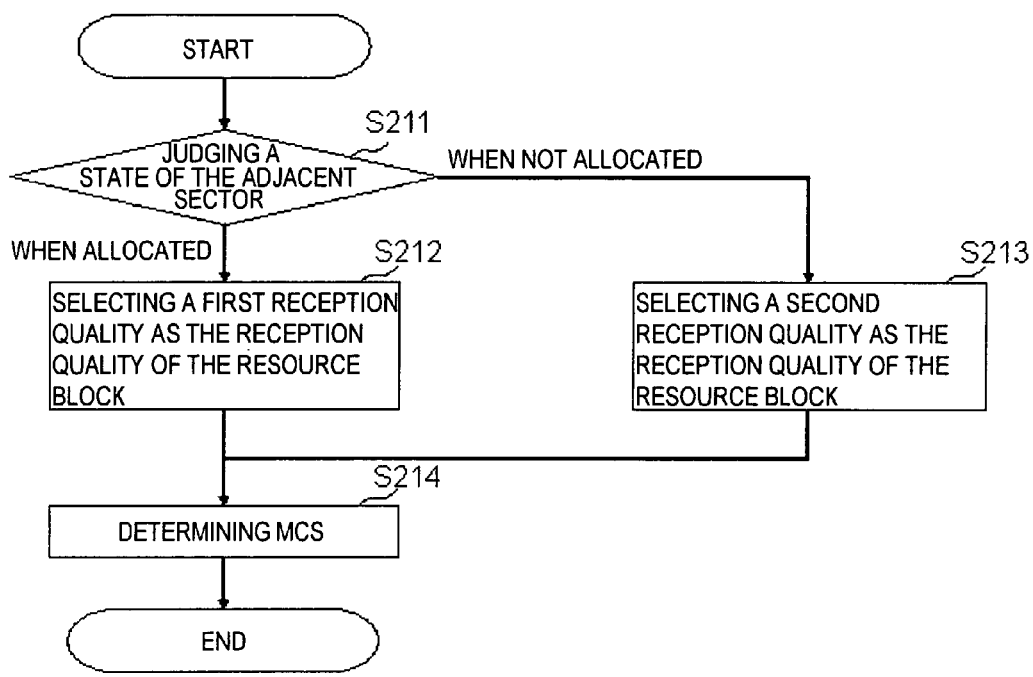
FIG. 4 is a flow chart showing the flow of operation in MCS determination in a base station according to a first exemplary embodiment of the invention.

Then the operation of MCS judgment unit (213) in base station (21) is described in detail. FIG. 4 is a flow chart showing the flow of operation in MCS determination in base station (21).

Firstly, MCS judgment unit (213) judges by the resource allocation information for all sectors in the cell of the base station whether the resource block is used or not in the adjacent sector (step S211).

MCS judgment unit (213) selects the first reception quality calculated by reception quality measurement unit (102) in mobile station (11) for the resource block when the resource block of the adjacent sector is judged to be allocated to other mobile station (step S212).

On the other hand, MCS judgment unit (213) selects the second reception quality calculated by second reception quality measurement unit (113) when the resource block of the adjacent sector is judged not to be allocated (step S213).

By these selected results, MCS judgment unit (213) determines MCS for the resource block (step S214).

In accordance with the present invention, it is possible to select MCS matched to the quality in receiving data in base station (21) even if there is a difference between the reception quality of the resource block reported from mobile station (11) (the first reception quality) and the reception quality of the resource block in receiving data practically (the second reception quality).

It is described in the aforementioned exemplary embodiment that mobile station (11) reports the reception quality calculated by second reception quality measurement unit (113) (the second reception quality) to base station (21), however, mobile station (11) may report a difference value (amount) of two reception qualities calculated by reception quality measurement unit (102) and second reception quality measurement unit (113) instead of the second reception quality. In this case, MCS judgment unit (213) in base station (21) uses an addition of the above-mentioned difference value to the reception quality reported from reception quality measurement unit (102) (the first reception quality) for the resource block when the resource block of the adjacent sector is judged not to be allocated. In this case, MCS matched to the quality in receiving data can be selected like the aforementioned exemplary embodiment.

Furthermore, mobile station (11) may report only maximum, minimum, or average value of the above-mentioned difference values for each resource block as the value used in common for all resource blocks instead of reporting the above-mentioned difference values of each resource block to base station (21). In also this case, it is possible to improve the reception quality reported from mobile station (11) (the first reception quality) by adding the above-mentioned value reported from the mobile station (11) to the reception quality reported from reception quality measurement unit (102) in mobile station (11) (the first reception quality) in base station (21) based on the allocation state of the resource like the above-mentioned exemplary embodiment.

Second Exemplary Embodiment

Figure 5:
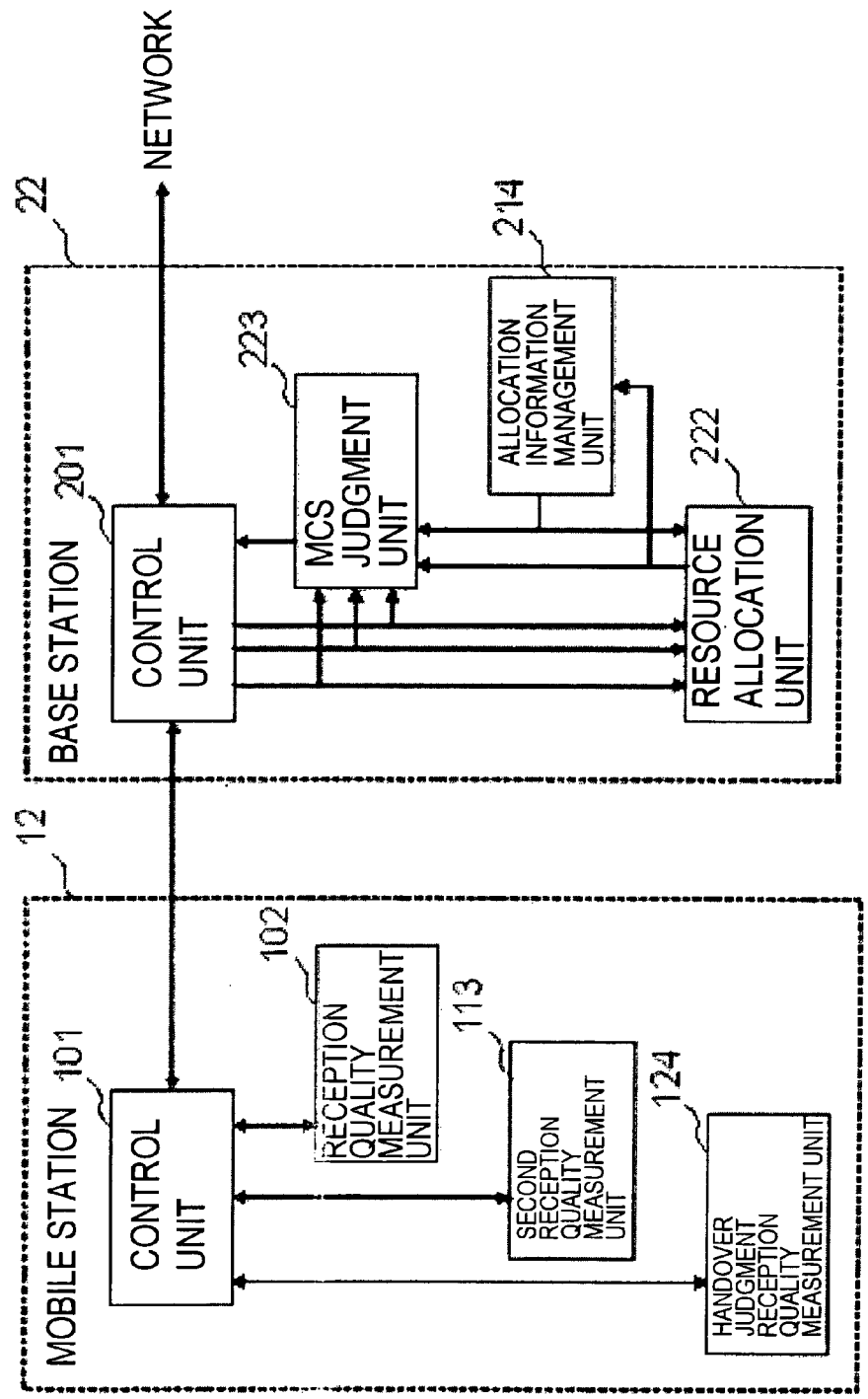
FIG. 5 is a block diagram showing a configuration of a wireless communication system according to a second exemplary embodiment of the invention.

A second exemplary embodiment of the invention will be now described in detail with reference to the drawings. FIG. 5 is a block diagram showing a configuration of a wireless communication system according to a second exemplary embodiment of the invention. As shown in FIG. 5, mobile station (12) in the second exemplary embodiment of the invention comprises control unit (101), measurement unit of reception quality (102), second reception quality measurement unit (113), and handover judgment reception quality measurement unit (124).

A difference between the present exemplary embodiment and the first exemplary embodiment is that mobile station (12) comprises handover judgment reception quality measurement unit (124) measuring the reception quality for judgment of handover necessity. However, handover judgment reception quality measurement unit (124) is installed in a commonly-used mobile station apparatus for the reception quality measurement used for the judgment of handover, and hence, there is no essential difference from mobile station (11) in the first exemplary embodiment.

Base station (22) in the second exemplary embodiment of the invention comprises control unit (201), resource allocation unit (222), MCS judgment unit (223), and resource allocation management unit (214), and performs allocation of the resource blocks and MCS determination based on two kinds of the reception quality information, handover judgment reception quality information reported from mobile station (12), and the allocation information of the resource blocks in all sectors in the cell of the base station.

Since control (201) and allocation information management unit (214) are the identical as those in base station (21) in the first exemplary embodiment, the explanation will be skipped.

Figure 6:
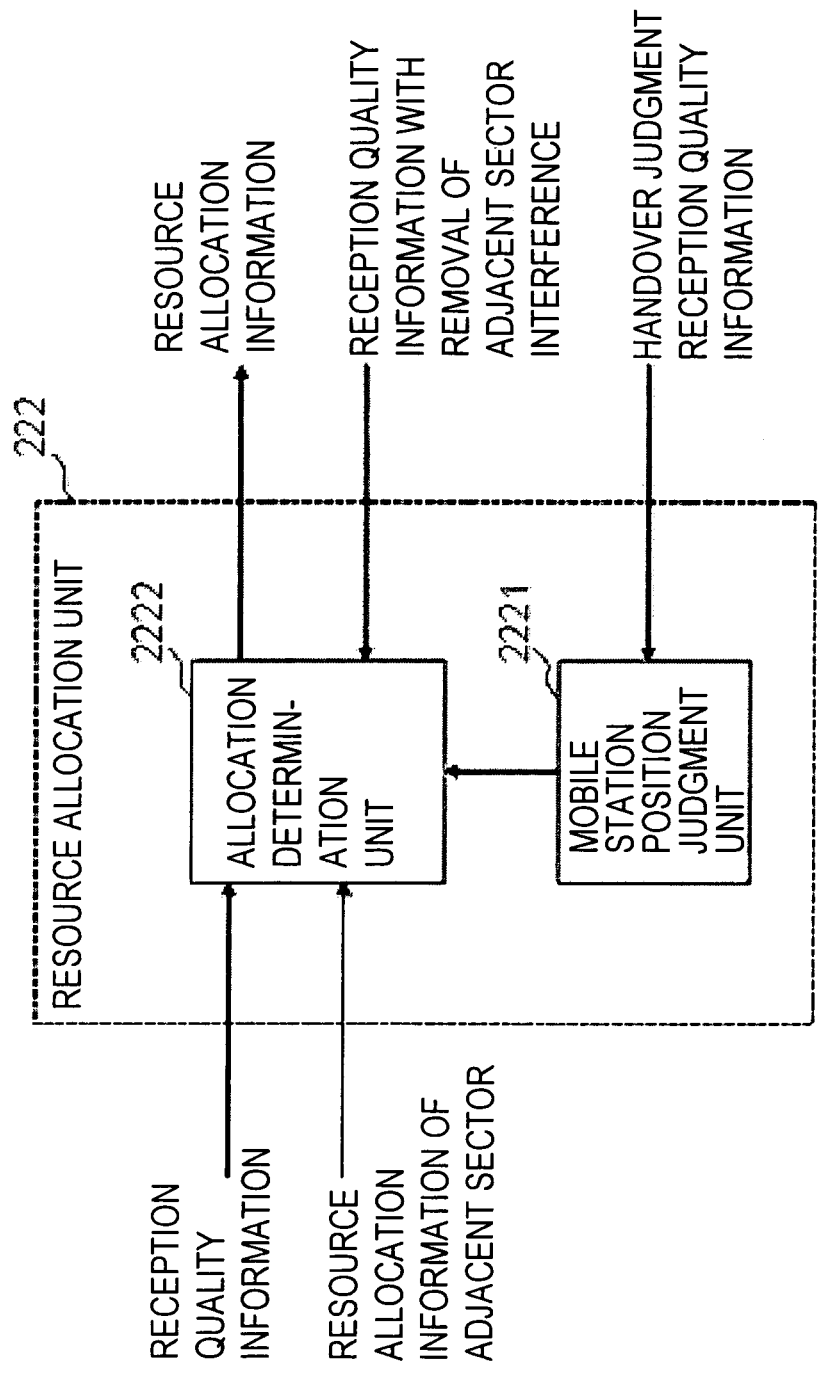
FIG. 6 is a block diagram showing a detailed configuration of resource allocation unit in a base station according to a second exemplary embodiment of the invention.

FIG. 6 is a block diagram showing a detailed configuration of resource allocation unit (222) in base station (22) according to a second exemplary embodiment of the invention. By referring to FIG. 6, resource allocation unit (222) of the second exemplary embodiment comprises mobile station position judgment unit (2221) and allocation determination unit (2222).

Mobile station position judgment unit (2221) judges a position of mobile station (12) in the sector based on the handover judgment reception quality information received from mobile station (12) and outputs it to allocation determination unit (2222).

Resource allocation determination unit (2222) receives the above-mentioned first and second reception quality information reported from the mobile station, resource allocation information in the sector adjacent to the sector with which mobile station (12) is connecting, and a position of mobile station (12) in the sector as input, and performs allocation of the resource blocks for each mobile station (scheduling).

Figure 7:
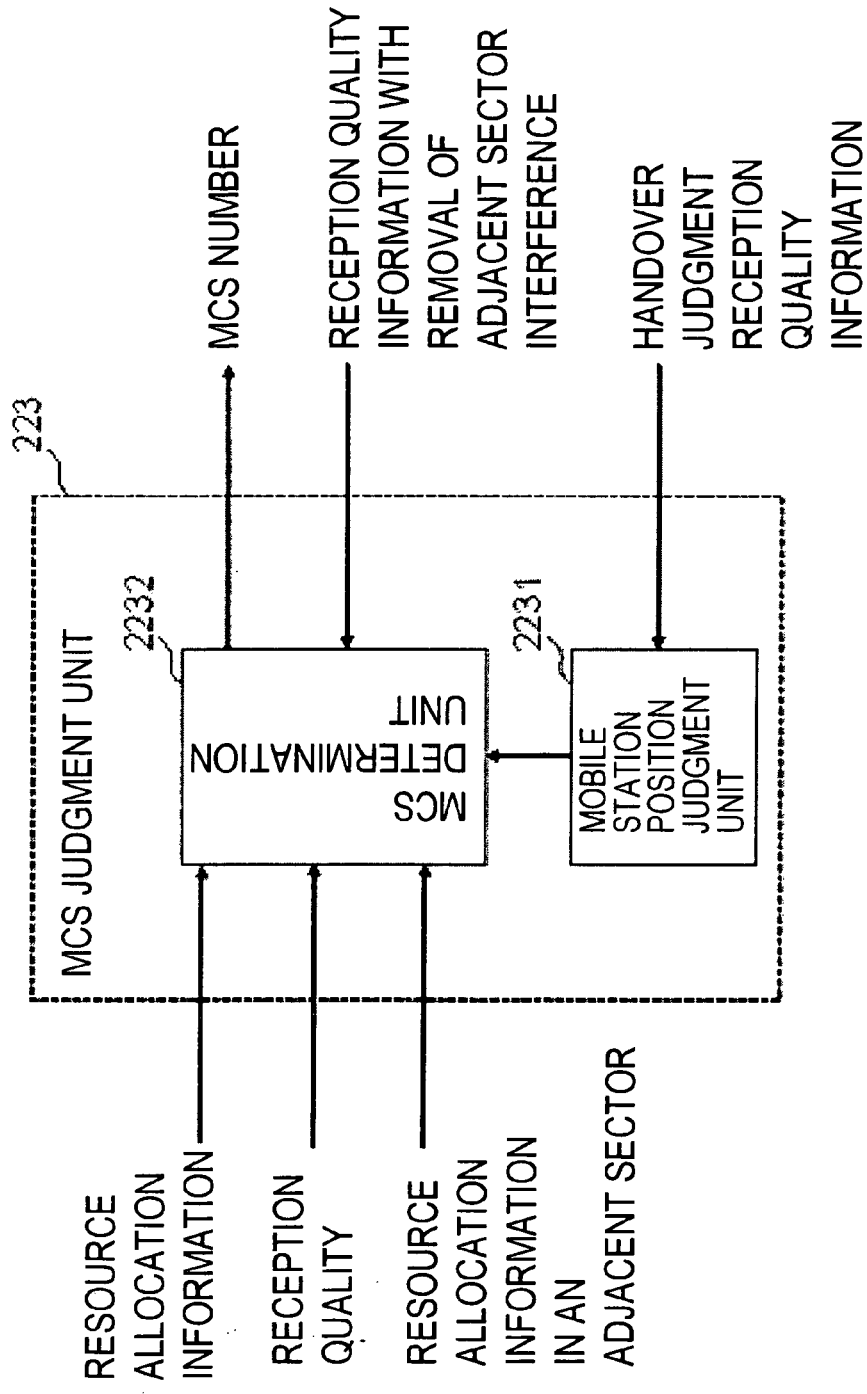
FIG. 7 is a block diagram showing a detailed configuration of MCS judgment unit in a base station according to a second exemplary embodiment of the invention.

FIG. 7 is a block diagram showing a detailed configuration of MCS judgment unit (223) in base station (22) according to a second exemplary embodiment of the invention. By referring FIG. 7, MCS judgment unit (223) of the second exemplary embodiment comprises mobile station position judgment unit (2231) and MCS determination unit (2232).

Mobile station position judgment unit (2231) judges a position of mobile station (12) in the sector based on the handover judgment reception quality information, and outputs it to MCS determination unit (2232).

MCS determination unit (2232) receives two kinds of the reception quality information reported by the above-mentioned mobile station, the resource allocation information in the sector to which the mobile station is connecting, and the resource allocation information of the sector adjacent to the above-mentioned sector as input, and outputs MCS number.

Then the operation of the present exemplary embodiment will be described in detail with the reference to the drawings. Since the operation in mobile station (12) is similar to that in the above-mentioned first exemplary embodiment except for an additional report about the handover judgment reception quality information, the operation in the base station will be described as follows.

Figure 8:
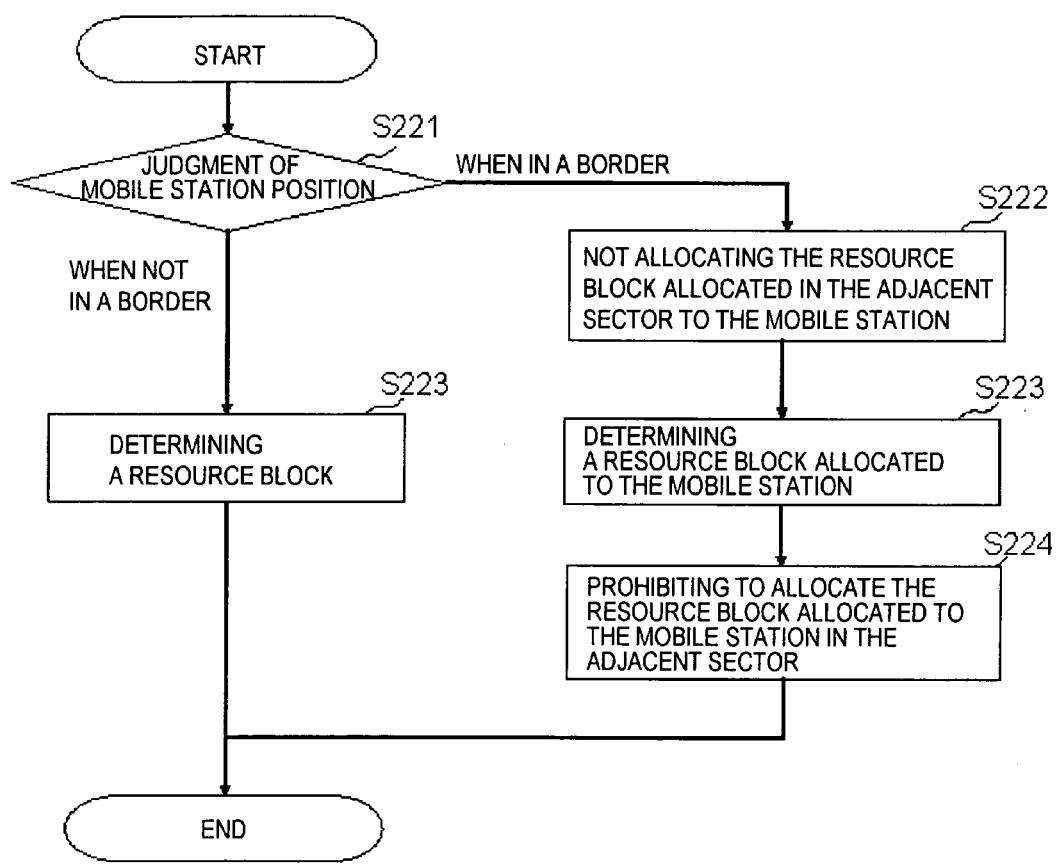
FIG. 8 is a flow chart showing the flow of operation in resource allocation in a base station according to a second exemplary embodiment of the invention.

FIG. 8 is a flow chart showing the flow of operation in resource allocation in base station (22). By referring to FIG. 8, firstly, mobile station position judgment unit (2221) in resource allocation unit (222) selects a mobile station from candidates of mobile stations having allocation opportunity in the cell of the base station, and judges whether mobile station 12 is near the sector border or not from the handover judgment reception quality information (step S221).

For example, mobile station position judgment unit (2221) judges that the above-mentioned mobile station (12) is near the sector border when the value of handover judgment reception quality is less than or equal to a predetermined threshold value.

Then allocation determination unit (2222) refers to allocation information management unit (214), and selects candidates of the resource blocks allocated to above-mentioned mobile station (12). Candidates of the resource blocks allocated to above-mentioned mobile station (12) are selected among the resource blocks which have not been allocated in the sector to which above-mentioned mobile station (12) is connecting.

When above-mentioned mobile station (12) is judged to be near a sector border, allocation determination unit (2222) removes a resource block allocated in the adjacent sector from candidates of the resource blocks allocated to above-mentioned mobile station (12) (step S222).

Furthermore, allocation determination measurement unit (2222) determines a resource block allocated to above-mentioned mobile station (12) among remaining candidates of allocation of resource blocks (step S223).

A conventional method can be applied to a method for resource block allocation in step S223.

After the resource block is allocated to above-mentioned mobile station (12), allocation determination measurement unit (2222) updates the information of allocation information management unit (214) so that the identical resource block as the resource block allocated to above-mentioned mobile station (12) won't be allocated (step S224).

When mobile station (12) is judged to be not near a sector border in step S222, the removal of the resource block (step S222) and the update of allocation information management unit (214) are not performed, and a resource block allocated to mobile station (12) among candidates of allocation resource blocks is determined (step S223).

Allocation determination unit (2222) performs the above-mentioned operations for all mobile stations which are candidates having an opportunity of allocation, or repeats the above-mentioned operation until the resources in all sectors of the cell of the base station are allocated.

Hence, the resource block allocated to the mobile station judged to be near a sector border is not allocated in the adjacent sector, and the reception quality of the mobile station in receiving data of above-mentioned resource block is not affected by the adjacent sector interference.

Figure 9:
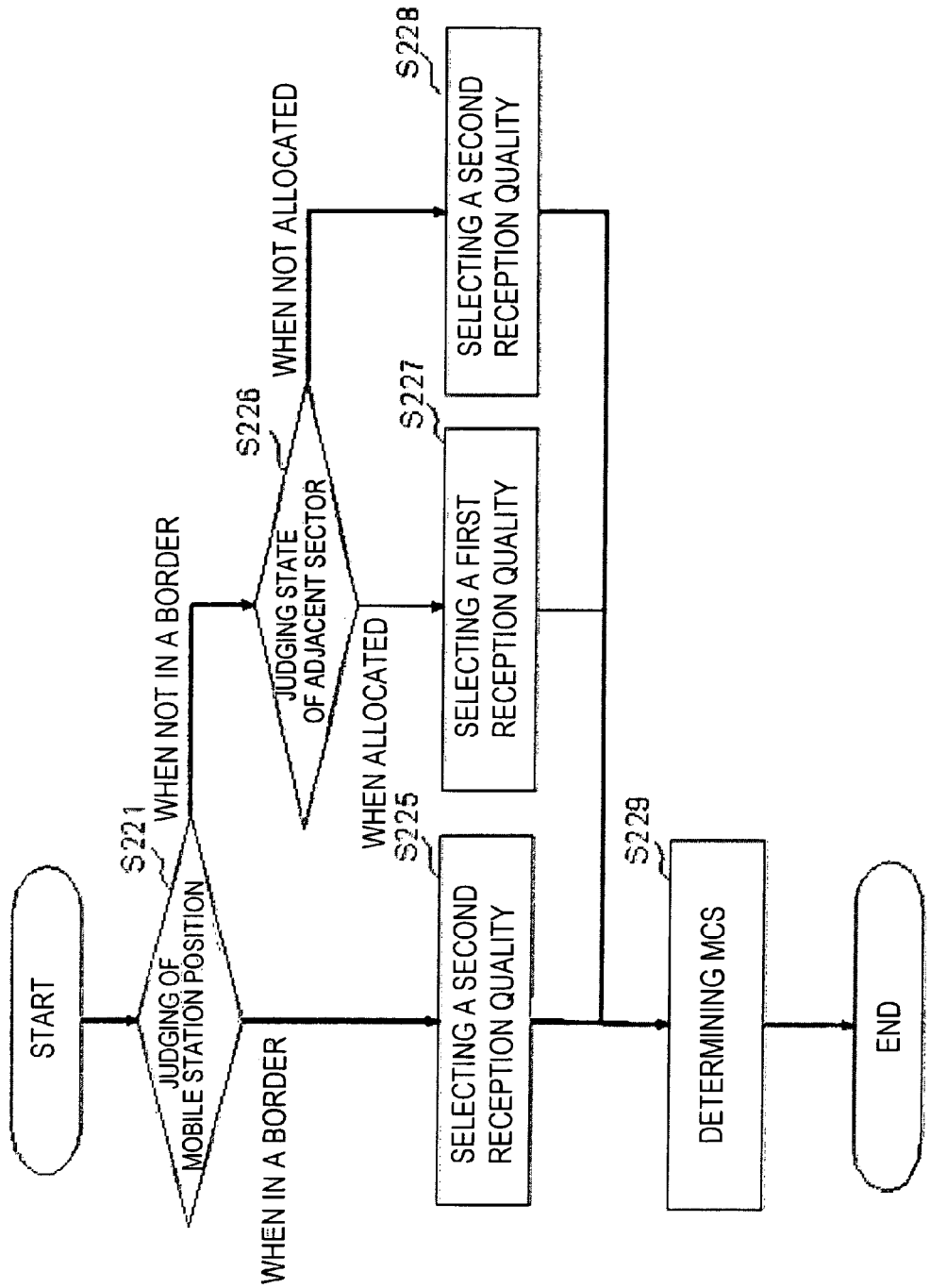
FIG. 9 is a flow chart showing the flow of operation in MCS determination in a base station according to a second exemplary embodiment of the invention.

After the resource is allocated by above-mentioned resource allocation unit (222), MCS determination is started by MCS judgment (223). FIG. 9 is a flow chart showing the flow of operation in MCS determination in base station (22). Referring to FIG. 9, firstly, mobile station position judgment unit (2231) in MCS judgment unit (223) selects a mobile station among candidates of mobile stations having allocation opportunity in the cell of the base station, and judges whether mobile station (12) is near a sector border or not by the handover judgment reception quality information of mobile station (12) (step S221). A judgment result of mobile station position judgment unit (2221) in resource allocation unit (222) can be also used instead of using mobile station position judgment unit (2231).

Since by resource allocation unit (222) the resource block which is not allocated in the adjacent sector is allocated to the mobile station which is judged to be near a sector border in step S221, MCS determination unit (2232) selects a reception quality with removal of an adjacent sector interference (the second reception quality) (step S225).

For other mobile stations, MCS determination unit (2232) judges by the resource allocation information of all sectors in the cell of the base station whether the resource block is used or not in the adjacent sector (step S226).

According to the result of above-mentioned judgment, MCS determination unit (2232) selects the reception quality (the first reception quality) which reception quality measurement unit (102) in mobile station (12) calculates for the resource block which is judged to be allocated in the adjacent sector (step S227).

On the other hand, MCS determination unit (2232) selects the reception quality (the second reception quality) with removal of the adjacent sector interference which reception quality measurement unit (113) in mobile station (12) calculates for the resource block which is judged to be not allocated in the adjacent sector (step S228).

MCS judgment unit (213) determines MCS for the resource block based on the selected result (step S229).

In accordance with the present invention, MCS matched to the reception quality in receiving data can be selected in base station (22) even if there is a difference between a reception quality of the resource block reported from mobile station (12) and a reception quality of the resource block in receiving data practically. Particularly, in the present exemplary embodiment, since the scheduling is performed so that inter-sector interference is not occurred when the mobile station is judged to be near a sector border, the service quality for user in the sector border can be stable.

Third Exemplary Embodiment

A third exemplary embodiment of the invention will be described in detail with reference to the drawings. FIG. 10 is a block diagram showing a configuration of a wireless communication system according to a third exemplary embodiment of the invention. A difference between the present exemplary embodiment and first exemplary embodiment is that the present exemplary embodiment does not need second reception quality measurement unit, and comprises reception quality estimation unit (235) in base station (23).

As shown in FIG. 10, mobile station (13) of the third exemplary embodiment of the invention comprises control unit (101), reception quality unit measurement unit (102), and handover judgment reception quality measurement unit (124).

Base station (23) comprises control unit (201), resource allocation unit (202), MCS judgment unit (213), allocation information measurement unit (214), and reception quality estimation unit (235).

Reception quality estimation unit (235) is connected with control unit (201) and MCS judgment unit (213), and calculates the reception quality with removal of the adjacent sector interference by the reception quality information reported from the mobile station and the handover judgment reception quality information.

Figure 11:
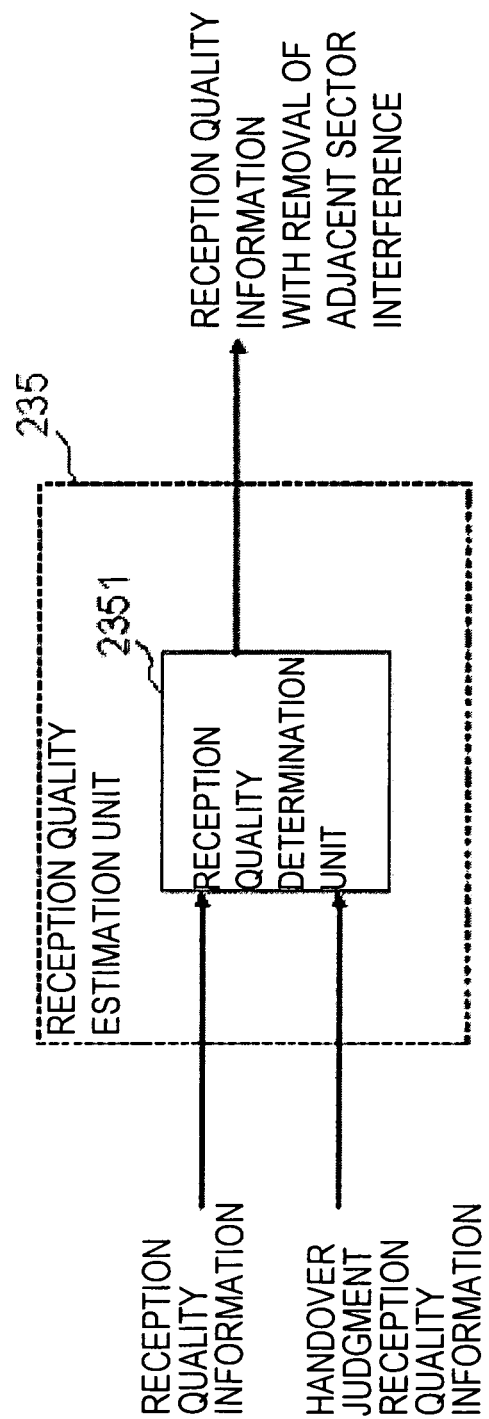
FIG. 11 is a block diagram showing a detailed configuration of reception quality estimation unit in a base station according to a third exemplary embodiment of the invention.

FIG. 11 is a block diagram showing a detailed configuration of reception quality estimation unit (235). Reception quality estimation unit (235) includes reception quality determination unit (2351) which receives the reception quality information reported from the mobile station, and the handover judgment reception quality information as inputs, and outputs the reception quality information with removal of the adjacent sector interference.

A method for calculating the reception quality with removal of the adjacent sector interference by reception quality determination unit (2351) will be described as follows.

The reception quality with removal of the adjacent sector interference which the base station needs to calculate is represented by above-mentioned Equation (2).

Reception quality determination unit (2351) judges a sector having the maximum received power obtained from the reference symbol unit among sectors with which the mobile station does not communicate as the adjacent sector $B_1$ by the handover judgment reception quality information.

The relation between the reception quality reported from mobile station (13) to base station (23) (the first reception quality) and the reception quality with removal of the adjacent sector which reception quality determination unit (2351) should calculate is represented as the following Equation (3).

$$SINR_{RB}(B_0, F_n) = \frac{S(B_0, F_n)}{\sum_{m=1}^{M} S(B_m, F_n) + W} \quad (3)$$

$$= \frac{S(B_0, F_n)}{\sum_{m=2}^{M} S(B_m, F_n) + W} \cdot \frac{\sum_{m=2}^{M} S(B_m, F_n) + W}{\sum_{m=1}^{M} S(B_m, F_n) + W}$$

$$= \overline{SINR}_{RB}(B_0, F_n) \frac{\sum_{m=2}^{M} S(B_m, F_n) + W}{\sum_{m=1}^{M} S(B_m, F_n) + W}$$

By transforming, Equation (3) is represented as the following Equation (4).

$$\overline{SINR}_{RB}(B_0, F_n) = SINR_{RB}(B_0, F_n) \frac{\sum_{m=1}^{M} S(B_m, F_n) + W}{\sum_{m=2}^{M} S(B_m, F_n) + W} \quad (4)$$

$SINR_{R\_B}(B_0, F_n)$ on the right hand side of Equation (4) is known. Hence, by calculating the numerator on the right hand side of Equation (4) i.e. the interference power which the mobile station receives from other sectors (the summation m=1 to M), and the denominator on the right hand side of Equation (4) i.e. the interference power which the mobile station received from other sectors without the adjacent sector interference (the summation m=2 to M), the reception quality with removal of the adjacent sector interference can be obtained by the reception quality reported from mobile station (13). The term of thermal noise is negligible by assuming it is small enough compared with the term of receiving power. If the ratio of the interference power from other sectors which mobile station (13) receives to the interference power from other sectors with removal of the adjacent sector interference which mobile station (13) receives is assumed to be approximately constant independent of the resource blocks, the aforementioned ratio of the interference power in all the bandwidth of the system is equal to the aforementioned ratios of the interference power in each resource block.

Therefore, by calculating the interference power from other sectors and the interference power from other sectors with removal of the adjacent sector interference which mobile station (13) receives from the handover judgment reception quality information, reception quality determination unit (2351) in base station (23) can approximately obtain the reception quality with removal of the adjacent sector interference from above-mentioned Equation (4).

Base station (23) can obtain an average reception quality of the signals in reference symbol unit (SINR) for the system bandwidth of each cell in which mobile station (13) receives with respect to all the system bandwidth from the mobile station, by the handover judgment reception quality information exception for reception quality $SINR_{RB}(B_0,F_n)$ for each resource block.

The handover judgment reception quality information reported from mobile station (13) is represented as the following Equation (5).

$$SINR_{BAND}(B_0) = \frac{\sum_{n=1}^{N} S_A(B_0, F_n)}{\sum_{m=1}^{M}\sum_{n=1}^{N} S_A(B_m, F_n) - \sum_{n=1}^{N} S_A(B_0, F_n) + W} \quad (5)$$

$SINR_{BAND}(B_0)$ represents a received SINR of the power transmitted from sector $B_0$, and $S_A(B_m, F_n)$ represents an average received power transmitted from sector $B_m$ in resource block $F_n$.

If mobile station (31) is in a sector border of the identical cell, and the distance from base station (23) is short, the received power from the sector to which mobile station (23) is connecting and the adjacent sector is enough larger than receiving power from the cell of other adjacent base station, and hence in calculating the received power, the power except for sector $B_0$ in which the mobile station is, and the adjacent sector $B_1$ can be neglected.

At this time, the approximated reception quality for all the bandwidth of the system is represented as the following Equation (6).

$$SINR_{BAND}(B_0) \approx \sum_{n=1}^{N} S_A(B_0, F_n) \Big/ \sum_{n=1}^{N} S_A(B_1, F_n) \quad (6)$$

-continued $$SINR_{BAND}(B_1) \approx \sum_{n=1}^{N} S_A(B_1, F_n) \Big/ \sum_{n=1}^{N} S_A(B_0, F_n)$$

$$SINR_{BAND}(B_m) \approx \sum_{n=1}^{N} S_A(B_m, F_n) \left( \frac{\sum_{n=1}^{N} S_A(B_0, F_n) +}{\sum_{n=1}^{N} S_A(B_1, F_n)} \right)$$

By transforming the equation about SINR of the transmitted power from the adjacent cell $B_m$ in all the bandwidth of the system in Equation (6), the following Equation (7) is obtained.

$$SINR_{BAND}(B_1)\sum_{n=1}^{N} S_A(B_0, F_n) = \sum_{n=1}^{N} S_A(B_1, F_n) \quad (7)$$

By using Equation (7), the reception quality from the adjacent cell $B_m$ (m>1) is represented as the following Equation (8).

$$SINR_{BAND}(B_m) \approx \frac{\sum_{n=1}^{N} S_A(B_m, F_n)}{\sum_{n=1}^{N} S_A(B_0, F_n) + \sum_{n=1}^{N} S_A(B_1, F_n)} = \quad (8)$$

$$\frac{\sum_{n=1}^{N} S_A(B_m, F_n)}{(1 + SINR_{BAND}(B_1))\sum_{n=1}^{N} S_A(B_0, F_n)}$$

By sorting out Equation (8), it is represented as the following Equation (9).

$$\frac{\sum_{n=1}^{N} S_A(B_m, F_n)}{\sum_{n=1}^{N} S_A(B_0, F_n)} = (1 + SINR_{BAND}(B_1))SINR_{BAND}(B_m) \quad (9)$$

As mentioned above, by assuming that the ratio of the interference power from other sectors which mobile station (13) receives to the interference power from other sectors with removal of the adjacent sector interference is approximately-constant between the resource blocks, the ratio of the interference power in all the bandwidth above-mentioned is equal to the ratios of the interference power in each resource block, and hence the following Equation (10) becomes true.

$$\frac{\sum_{m=1}^{M} S(B_m, F_n) + W}{\sum_{m=2}^{M} S(B_m, F_n) + W} \approx \frac{\sum_{m=1}^{M}\sum_{n=1}^{N} S_A(B_m, F_n) + W}{\sum_{m=2}^{M}\sum_{n=1}^{N} S_A(B_m, F_n) + W} \approx \frac{\sum_{m=1}^{M}\sum_{n=1}^{N} S_A(B_m, F_n)}{\sum_{m=2}^{M}\sum_{n=1}^{N} S_A(B_m, F_n)} \quad (10)$$

The ratio of the interference power from other sectors which the mobile station receives in all the bandwidth of the system to the interference power from other sectors with removal of the adjacent sector interference in Equation (10) is represented as the following Equation (11) by using the above-mentioned equation.

$$\frac{\sum_{m=1}^{M}\sum_{n=1}^{N}S_A(B_m,F_n)}{\sum_{m=2}^{M}\sum_{n=1}^{N}S_A(B_m,F_n)} = \frac{\sum_{n=1}^{N}S_A(B_1,F_n) + \sum_{m=2}^{M}\sum_{n=1}^{N}S_A(B_m,F_n)}{\sum_{m=2}^{M}\sum_{n=1}^{N}S_A(B_m,F_n)} \qquad (11)$$

$$= \frac{\frac{\sum_{n=1}^{N}S_A(B_1,F_n)}{\sum_{n=1}^{N}S_A(B_0,F_n)} + \frac{\sum_{m=2}^{M}\sum_{n=1}^{N}S_A(B_m,F_n)}{\sum_{n=1}^{N}S_A(B_0,F_n)}}{\frac{\sum_{m=2}^{M}\sum_{n=1}^{N}S_A(B_m,F_n)}{\sum_{n=1}^{N}S_A(B_0,F_n)}}$$

$$= \frac{SINR_{BAND}(B_1) + (1 + SINR_{BAND}(B_1))\sum_{m=1}^{M}SINR_{BAND}(B_m)}{(1 + SINR_{BAND}(B_1))\sum_{m=1}^{M}SINR_{BAND}(B_m)}$$

The reception quality with removal of the adjacent sector interference is approximately represented as the following Equation (12).

$$\overline{SINR}_{RB}(B_0,F_n) \approx SINR_{RB}(B_0,F_n)\frac{\sum_{m=1}^{M}S(B_m,F_n)+W}{\sum_{m=2}^{M}S(B_m,F_n)+W} \approx \qquad (12)$$

$$SINR_{RB}(B_0,F_n)\frac{\sum_{m=1}^{M}\sum_{n=1}^{N}S_A(B_m,F_n)}{\sum_{m=2}^{M}\sum_{n=1}^{N}S_A(B_m,F_n)} = SINR_{RB}(B_0,F_n)$$

$$\frac{SINR_{BAND}(B_1) + (1 + SINR_{BAND}(B_1))\sum_{m=1}^{M}SINR_{BAND}(B_m)}{(1 + SINR_{BAND}(B_1))\sum_{m=1}^{M}SINR_{BAND}(B_m)}$$

Then the operation of the present exemplary embodiment will be described in detail with reference to the drawings. Since the operation of mobile station (13) is similar to that in the first exemplary embodiment other than eliminating the need for reporting the reception quality information with removal of the adjacent sector interference, the operation of base station (23) will be described.

Figure 12:
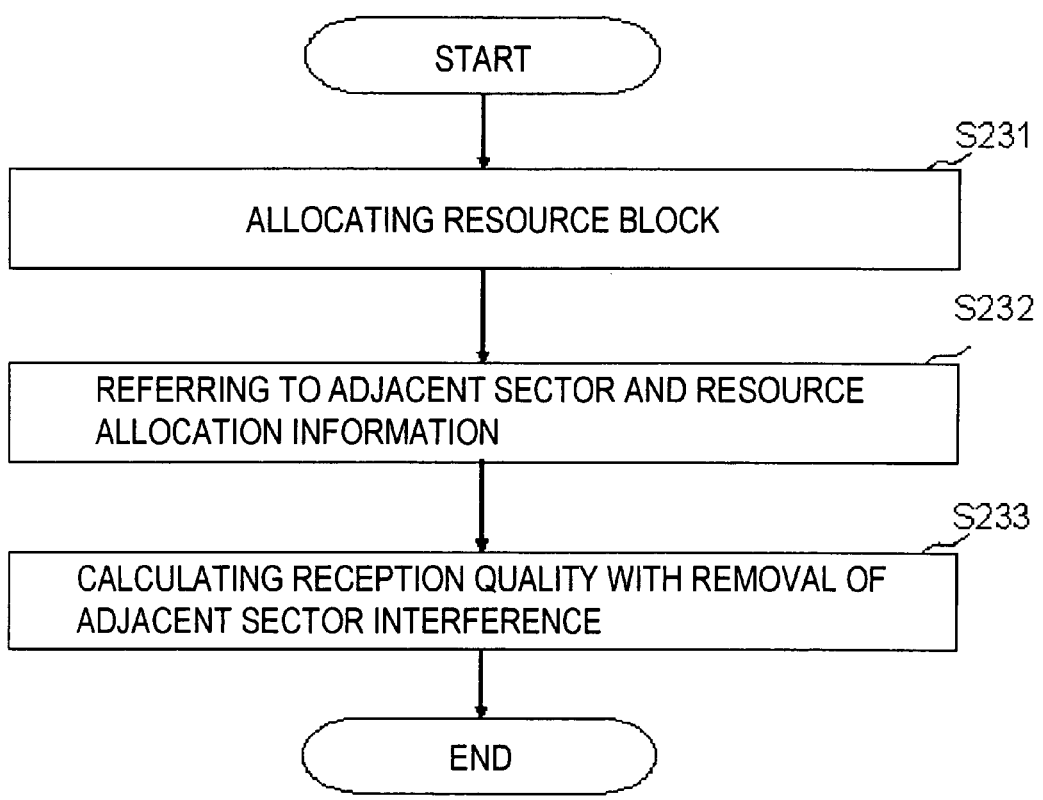
FIG. 12 is a flow chart showing the flow of operation in a base station according to a third exemplary embodiment of the invention.

FIG. 12 is a flow chart showing the flow of the resource allocation operation and the MCS determination operation in base station (23). By referring to FIG. 12, firstly, resource allocation unit (202) allocates the resource block just like the first exemplary embodiment (step S231), and after the resource allocation information is exchanged with the adjacent sector (step S232), the reception quality with removal of the adjacent sector interference is calculated (step S233).

As mentioned above, in the present exemplary embodiment, even if there is a difference between the reception quality of the resource block reported from mobile station (13) and the reception quality of the resource block in receiving data practically, MCS matched to the quality in receiving data can be selected in base station (23). Particularly, the present exemplary embodiment has a merit that second receiving means can be omitted.

Fourth Exemplary Embodiment

Figure 13:
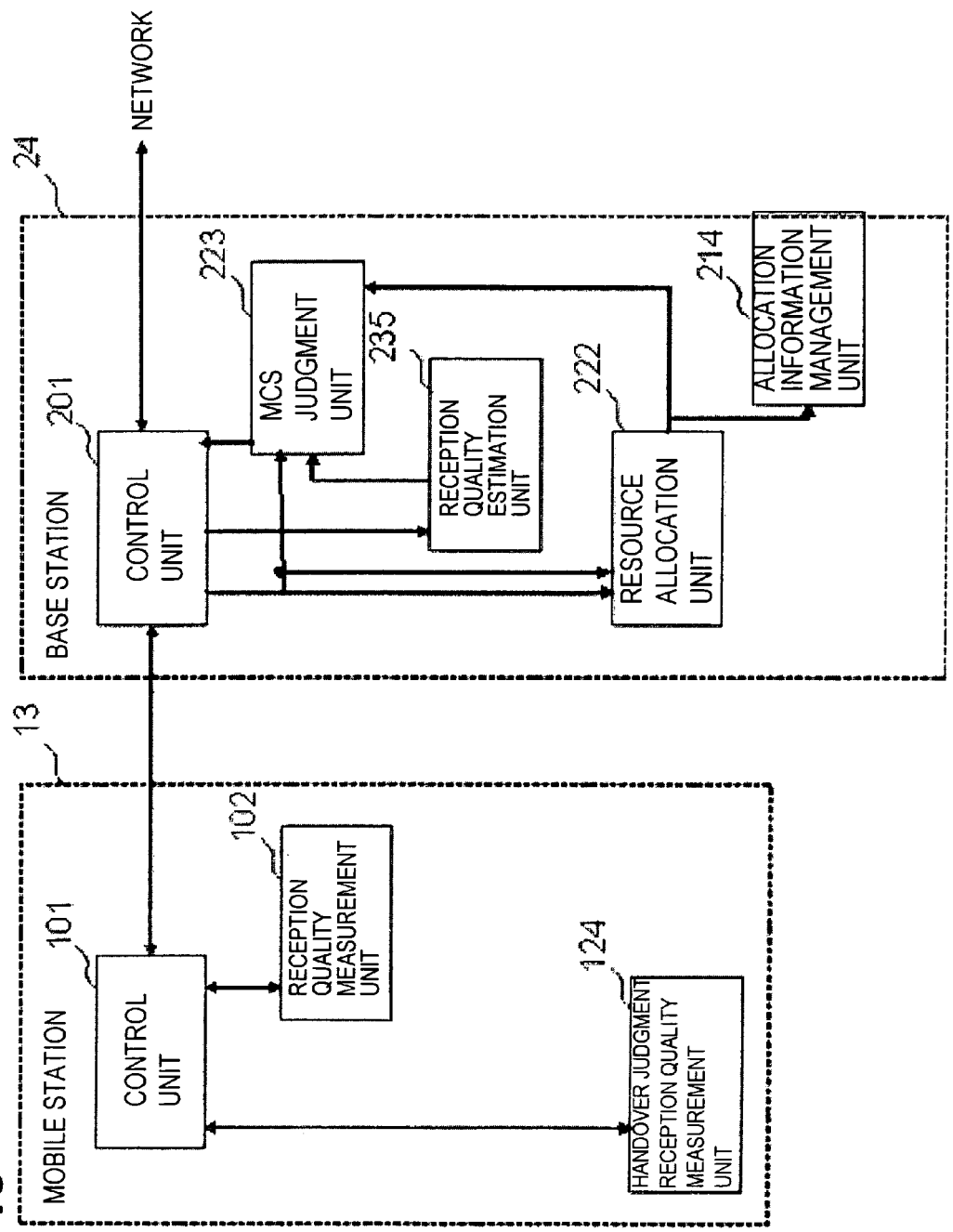
FIG. 13 is a block diagram showing a configuration of a wireless communication system according to a fourth exemplary embodiment of the invention.

Then a fourth exemplary embodiment of the present invention will be described in detail with reference to the drawings. FIG. 13 is a block diagram showing a configuration of a wireless communication system according to the fourth exemplary embodiment of the invention.

The difference between the present exemplary embodiment and the first exemplary embodiment is that like the aforementioned third exemplary embodiment, the present exemplary embodiment does not need the second reception quality measurement unit, and includes reception quality estimation unit (235) in base station (24).

Mobile station (13) in the fourth exemplary embodiment of the invention comprises control unit (101), reception quality measurement unit (102), and handover judgment reception quality measurement unit (124).

Mobile station (24) in the fourth exemplary embodiment of the invention comprises control unit (201), resource allocation unit (222), MCS judgment unit (223), resource allocation management unit (214), and reception quality estimation unit (235), and performs allocating the resource block, and determining MCS by the reception quality information reported from mobile station (13), and the allocation information of the resource blocks in all sectors of the cell of the base station.

Control unit (201) and allocation information management unit (214) have been described in the aforementioned first exemplary embodiment. Resource allocation unit (222) and MCS judgment unit (223) have been described in the aforementioned second exemplary embodiment. Reception quality estimation unit (235) has been described in the aforementioned third exemplary embodiment.

Then the operation of the present exemplary embodiment will be described in detail with reference to the drawings. Since the operation of mobile station is similar to the operation in the first exemplary embodiment other than eliminating need for reporting the reception quality with removal of the adjacent sector interference, the operation of mobile station 24 will be described.

Figure 14:
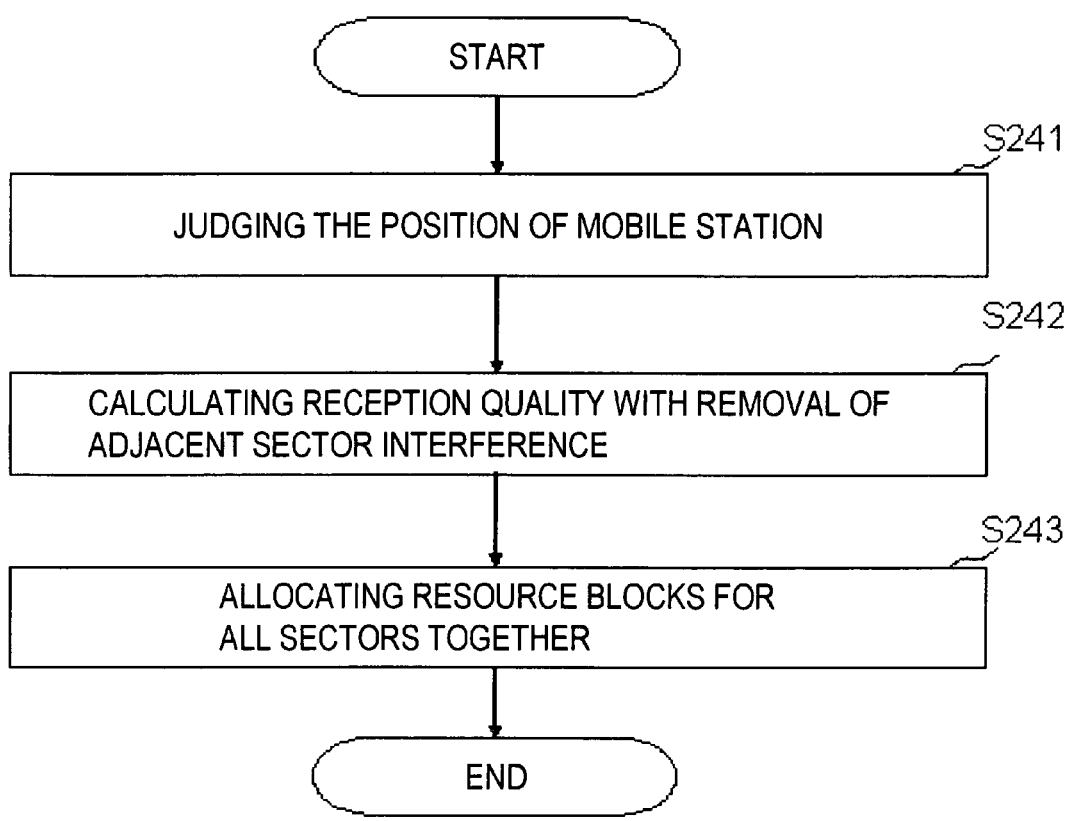
FIG. 14 is a flow chart showing the flow of operation in a base station according to a fourth exemplary embodiment of the invention.

FIG. 14 is a flow chart showing the flow of the resource allocation operation and the MCS determination operation in base station (24). By referring to FIG. 14, firstly, base station (24) judges the position of mobile station (13) (step S241).

Next, base station (24) calculates the reception quality with removal of the adjacent sector interference in reception quality estimation unit (235) (step S242).

Next, base station (24) performs allocating together for all sectors of the intra-station (step S243). The operation of judging the position of mobile station (13) in above-mentioned step S241, and the operation of allocating together by all sectors are the same as the operation S221 to S224 of base station (22) in the second exemplary embodiment. Resource allocation unit (222) obtains the reception quality information with removal of the adjacent sector interference from mobile station (12) in the second exemplary embodiment. However, it is obtained by calculating in reception quality estimation unit (235) in the present exemplary embodiment.

After the operation mentioned above, MCS judgment unit (223) receives the resource allocation information from resource allocation unit (222), and outputs a MCS number.

Since the operation of MCS judgment unit (223) is similar to that in the second exemplary embodiment, the explanation will be omitted.

As mentioned above, in the present exemplary embodiment, the effects equivalent to the aforementioned second and the third exemplary embodiments such as a stable service quality for users near a sector border and simplified configuration of the mobile station can be obtained.

Fifth Exemplary Embodiment

Figure 15:
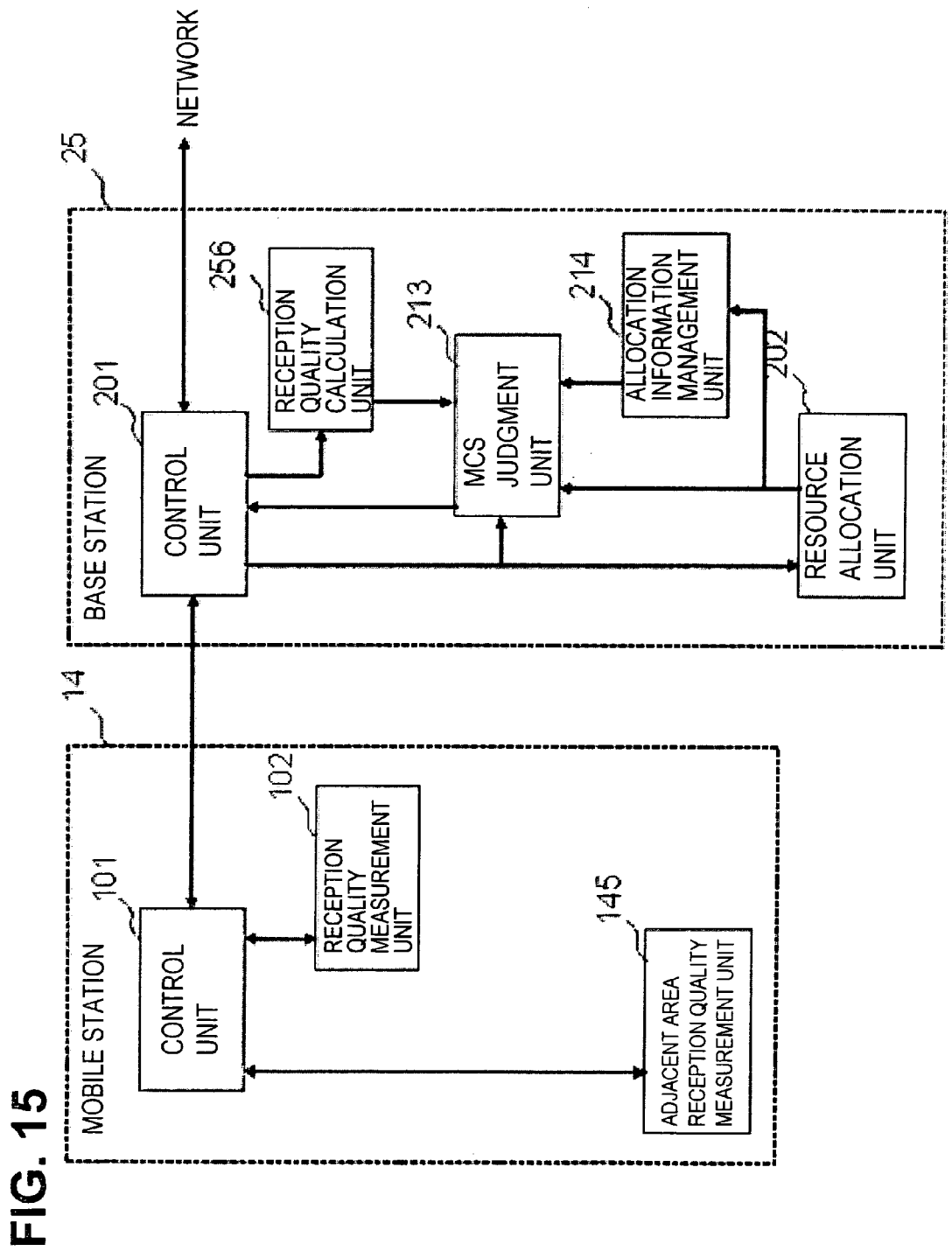
FIG. 15 is a block diagram showing a configuration of a wireless communication system according to a fifth exemplary embodiment of the invention.

Then a fifth exemplary embodiment of the invention will be described in detail with reference to the drawings. FIG. 15 is a block diagram showing a configuration of a wireless communication system according to the fifth exemplary embodiment of the invention. As shown in FIG. 15, mobile station (14) in the fifth exemplary embodiment of the invention comprises control unit (101), reception quality measurement unit (102), and adjacent area reception quality measurement unit (45). The difference from the aforementioned first embodiment is that the mobile station reports the reception quality of the resource block in the adjacent sector to the base station instead of the reception quality of the resource block, with removal of the adjacent sector interference, and calculates the reception quality in the base station.

Adjacent area reception quality measurement unit (145) is means measuring the reception quality of the resource block in the adjacent sector.

Base station (25) comprises base station operation unit (201), resource allocation unit (202), MCS judgment unit (213), allocation information management unit (214), and reception quality calculation unit (256).

Since the operation of mobile station (14) is similar to that in the first exemplary embodiment other than transmitting the reception quality of the resource block of the adjacent sector instead of transmitting the reception quality of the resource block with removal of the adjacent sector interference (the second reception quality), the explanation will be omitted.

Since the operation of base station (25) is similar to that in the first exemplary embodiment other than reception quality calculation unit (256) gives the reception quality of the resource block with removal of the adjacent sector interference (the second reception quality) to MCS judgment unit (213) instead of the reception quality of the resource block with removal of the adjacent sector interference (the second reception quality), the explanation will be omitted.

The derivation procedure of the reception quality with removal of the adjacent sector interference in reception quality calculation unit (256) will be described as follows.

If the reception quality with removal of the adjacent sector interference which mobile station (11) calculates in the aforementioned first exemplary embodiment is separated to each element, it can be separated to reception qualities of each resource block and reception qualities of each resource block of the adjacent sector (referring to the following Equation (13)). The reception qualities of each resource block of the adjacent sector are calculated by the following Equation (13).

$$SINR_{RB}(B_1, F_n) \frac{S(B_1, F_n)}{S(B_0, F_n) + W + \sum_{m=2}^{M} S(B_m, F_n)} \quad (13)$$

Reception qualities of each resource block $SINR_{RB}(B_0, F_n)$ can be calculated by Equation (1) mentioned in the beginning. Adjacent area reception quality measurement unit (145) in the fifth exemplary embodiment measures the reception qualities of each resource block of the adjacent sector $SINR_{RB}(B_1, F_n)$.

Reception quality calculation unit (256) in base station (25) calculates the reception quality with removal of the adjacent sector interference from the following Equation (14), by using the reception qualities of each resource block $SINR_{RB}(B_0, F_n)$ and the reception qualities of each resource block of the adjacent sector reported from the mobile station $SINR_{RB}(B_1, F_n)$.

$$\overline{SINR}(B_0, F_n) = \frac{S(B_0, F_n)}{W + \sum_{m=2}^{M} S(B_m, F_n)} \cdot \frac{S(B_0, F_n)}{W + \sum_{m=1}^{M} S(B_m, F_n)} \cdot$$

$$\frac{W + \sum_{m=1}^{M} S(B_m, F_n)}{-S(B_1, F_n) + W + \sum_{m=1}^{M} S(B_m, F_n)}$$

$$= \frac{S(B_0, F_n)}{W + \sum_{m=1}^{M} S(B_m, F_n)} \cdot$$

$$\frac{S(B_1, F_n) + S(B_0, F_n) + W + \sum_{m=2}^{M} S(B_m, F_n)}{S(B_0, F_n) + W + \left(\sum_{m=2}^{M} S(B_m, F_n)\right) - \frac{S(B_0, F_n) \cdot S(B_1, F_n)}{\left(W + \sum_{m=1}^{M} S(B_m, F_n)\right)}}$$

$$= \frac{S(B_0, F_n)}{\sum_{m=1}^{M} S(B_m, F_n) + W} \cdot$$

$$\frac{\frac{S(B_1, F_n)}{S(B_0, F_n) + W + \sum_{m=2}^{M} S(B_m, F_n)} + 1}{1 - \frac{S(B_0, F_n)}{W + \sum_{m=1}^{M} S(B_m, F_n)} \cdot \frac{S(B_1, F_n)}{S(B_0, F_n) + W + \sum_{m=2}^{M} S(B_m, F_n)}}$$

$$= SINR(B_0, F_n) \cdot \frac{(SINR(B_1, F_n) + 1)}{1 - SINR(B_0, F_n) \cdot SINR(B_1, F_n)}$$

(14)

As mentioned above, by the configuration of the present exemplary embodiment, the effect equivalent to the aforementioned first exemplary embodiment can be obtained.

Sixth Exemplary Embodiment

Figure 16:
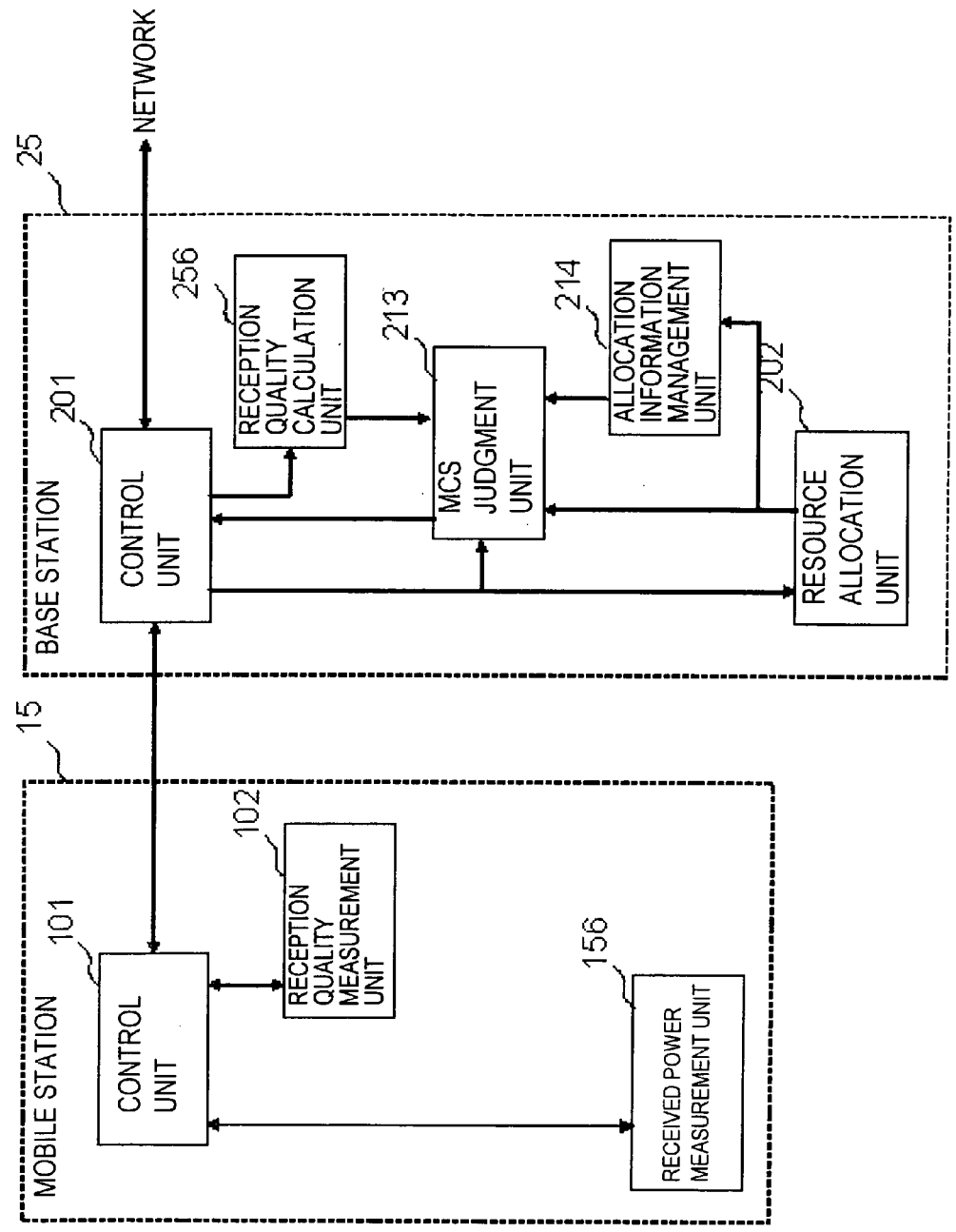
FIG. 16 is a block diagram showing a configuration of a wireless communication system according to a sixth exemplary embodiment of the invention.

Then a sixth exemplary embodiment of the invention will be described in detail with reference to the drawings. FIG. 16 is a block diagram showing a configuration of a wireless communication system according to a sixth exemplary embodiment of the invention. As shown in FIG. 16, mobile station (15) in the sixth exemplary embodiment of the invention comprises control unit (101), reception quality measurement unit (102), and received power measurement unit (156). The difference from the aforementioned first exemplary embodiment is that the mobile station reports the received power from the adjacent sector and the received power from other cells to the base station instead of the reception of the resource block with removal of the adjacent sector interference, and the base station calculates the reception quality with removal of the adjacent sector interference by using these values.

As it will be described later, the mobile station may report the values of the received power of the adjacent sector divided by the received power from other cells to the base station instead of the above-mentioned combination of the received power of the adjacent sector and the received power of other cells of each resource block.

Receiving power measurement unit (156) is means measuring the received power of each resource block from the adjacent sector and the received power from other cells respectively.

Base station (25) comprises base station operation unit (201), resource allocation unit (202), MCS judgment unit (213), allocation information management unit (214), and reception quality calculation unit (256).

Since the operation of above-mentioned mobile station (14) is similar to that of the mobile station of the first exemplary embodiment other than transmitting the combination of the received power of each resource block from the adjacent sector and the received power from other cells instead of the reception quality of the resource block with removal of the adjacent sector interference (the second reception quality), the explanation will be omitted.

Since the operation of base station (25) is similar to that of the base station of the first exemplary embodiment other than reception quality calculation unit (256) gives the reception quality of the resource block with removal of the adjacent sector interference (the second reception quality) to MCS judgment unit (213) instead of the reception quality of the resource block with removal of the adjacent sector interference, the explanation will be omitted.

The reception quality with removal of the adjacent sector interference which the mobile station calculates in the first exemplary embodiment is formed of the received power from the sector with which the mobile station is communicating at present time, the received power from the sector adjacent to the above-mentioned sector, and the total received power from other cells (refer to Equation (2)).

Even if the received power from the sector with which the mobile station is communicating at the present time of aforementioned three kinds of the received power is not reported, the base station can obtain the reception quality with removal of adjacent sector interference.

A method for calculating the reception quality with removal of the adjacent sector interference from above-mentioned two kinds of received power will be described as follows.

The reception quality with removal of the adjacent sector interference which the mobile station calculates in the first exemplary embodiment can be separated to the received power from the adjacent sector $S(B_1, F_n)$, the total received power from other cells $S(B_m, F_n)$, [where m=2 to M], and the reception qualities of each resource block $SINR_{RB}(B_0, F_n)$ as shown in the following Equation (15).

$$\overline{SINR}(B_0, F_n) = \frac{S(B_0, F_n)}{W + \sum_{m=2}^{M} S(B_m, F_n)} \qquad (15)$$

$$= \frac{S(B_0, F_n)}{W + \sum_{m=1}^{M} S(B_m, F_n)} \cdot \frac{S(B_1, F_n) + W + \sum_{m=2}^{M} S(B_m, F_n)}{W + \sum_{m=2}^{M} S(B_m, F_n)}$$

$$= SINR(B_0, F_n) \cdot \frac{\sum_{m=2}^{M} S(B_m, F_n) + W + S(B_1, F_n)}{\sum_{m=2}^{M} S(B_m, F_n) + W}$$

The reception qualities of each resource block $SINR_{RB}(B_0, F_n)$ in Equation (15) is measured by reception quality measurement unit (102) in mobile station (15) based on Equation (1) mentioned in the beginning. Since the received power from the adjacent sector $S(B_1, F_n)$ and the total received power from other cells $S(B_m, F_n)$ [where m=2 to M] have been derived when calculating the reception qualities of each resource block $SINR_{RB}(B_0, F_n)$, these values can be used.

In the present exemplary embodiment, by letting mobile station (15) report newly the received power from the adjacent sector and the total received power from other cells in above-mentioned Equation (15) to base station (25), base station (25) can calculate the reception quality with removal of the adjacent sector interference.

The ratio of the received power from the adjacent sector to the total received power from other cells can be obtained from the following Equation (16).

$$R(B_1, F_n) = \frac{S(B_1, F_n)}{\sum_{m=2}^{M} S(B_m, F_n) + W} \qquad (16)$$

$R(B_m, F_n)$ represents the ratio of the received power from the adjacent sector to the total received power from other cells in resource block $F_n$ of sector $B_m$.

By using the ratio $R(B_m, F_n)$ of the received power from the adjacent sector to the total received power from other cells that is calculated in the above Equation (16), the reception quality with removal of the adjacent sector interference can be calculated by the following Equation (17) transformed from Equation (15).

$$\overline{SINR}(B_0, F_n) = \frac{S(B_0, F_n)}{\sum_{m=1}^{M} S(B_m, F_n) + W} \cdot \frac{\sum_{m=2}^{M} S(B_m, F_n) + W + S(B_1, F_n)}{\sum_{m=2}^{M} S(B_m, F_n) + W} \qquad (17)$$

$$= SINR(B_0, F_n) \cdot (1 + R(B_1, F_n))$$

Therefore, reception quality calculation unit (256) in base station (25) substitutes the information reported from the mobile station into the above Equation (17), and can calculate the reception quality with removal of the adjacent sector interference (the second reception quality) which the mobile station calculated in the first exemplary embodiment.

As mentioned above, the effect equivalent to the first exemplary embodiment can be also obtained by the constitution of the present exemplary embodiment.

Figure 17:
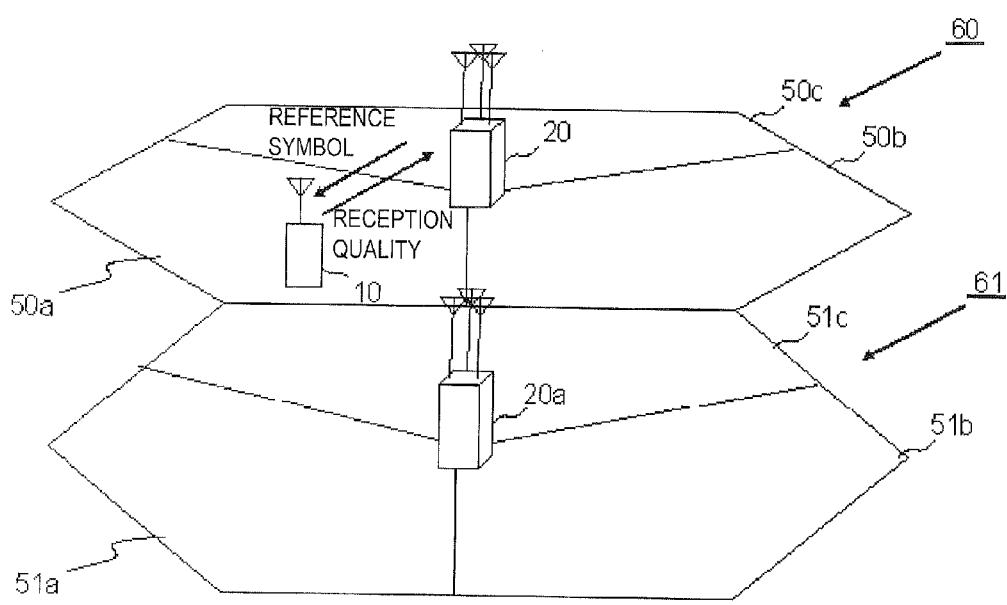
FIG. 17 is an illustration showing an overall configuration of a wireless communication system.

As mentioned above, the preferred exemplary embodiments of the invention are described. However, it should be noted that the invention is not limited to the aforementioned exemplary embodiments, and includes variations, substitutions, and modifications without departing from the scope of the fundamental technical spirit of the present invention. For example, the invention is not limited to the cell/sector constitution as illustrated in FIG. 17, if the base station can comprehend the allocation state of the resource block of the area adjacent to the base station, the invention can be applied to other kinds of cell constitution.

For example, in the illustrations of each exemplary embodiment, the examples in which the invention is applied to the inter-sector in an identical base station are described. However, by being possible to notify or exchange the allocation information of the resource block or the reception quality information between base stations whose cells are adjacent each other via nodes of base stations, base station control apparatuses, apparatuses provided separately, or the like on the wireless communication network, the adjacent sector interference between a plurality of adjacent base stations can be estimated and an appropriate MCS can be also selected. The entire disclosure of above mentioned Patent Documents or the like are incorporated herein by reference thereto. The exemplary embodiments and examples may include variations and modifications without departing the gist and scope of the present invention as disclosed herein and claimed as appended herewith, and furthermore based on the fundamental technical spirit. It should be noted that any combination and/or selection of the disclosed elements may fall within the claims of the present invention. That is, it should be noted that the present invention of course includes various variations and modifications that could be made by those skilled in the art according to the overall disclosures including claims and technical spirit.

EXPLANATIONS OF SYMBOLS 10,11,12,13,14,15 mobile station
20,21,22,23,24,25 base station
50a,50b,50c,51a,51b,51c sector
60,61 cell
101 mobile station operating unit
102 reception quality measurement unit
113 second reception quality measurement unit
124 handover judgment reception quality measurement unit
145 adjacent area reception quality measurement unit
156 received power measurement unit
201 base station operating unit
222 resource allocation unit
203,213,223 MCS judgment unit
214 allocation information management unit
235 reception quality estimation unit
256 reception quality calculation unit
2021 allocation determination unit
2031,2131,2232 MCS determination unit
2221 mobile station position judgment unit
2222 resource allocation determination unit
2351 reception quality determination unit

The invention claimed is:

1. A wireless communication system comprising a base station, wherein:
    said base station performs scheduling for determining a resource block allocated to a mobile station, and determines a downlink transmission parameter based on a reception quality reported from said mobile station;
    said base station determines a transmission parameter by a predetermined first method for determining a transmission parameter when an identical resource block as a resource block allocated to any mobile station is allocated in an area adjacent to an area to which said mobile station is connecting,
    said base station determines a transmission parameter by a second method for determining a transmission parameter which selects a transmission parameter having a transmitting efficiency equal to or greater than that by said first method for determining a transmission parameter when an identical resource block as a resource block allocated to any mobile station is not allocated in an area adjacent to an area to which said mobile station is connecting,
    said mobile station comprises a unit for measuring a received power of a reference symbol from said adjacent area and a received power of reference symbols from other areas and reports said two received powers or a ratio of said two received powers to said base station, and
    said base station calculates a reception quality with removal of a reception quality deterioration amount due to an interference to said adjacent area by using a ratio of a received power of a reference symbol from said adjacent area and a received power of reference symbols from other areas, and determines the transmission parameter when the identical resource block as the resource block allocated to said mobile station is not allocated in the area adjacent to the area to which said mobile station is connecting.

2. The wireless communication system according to claim 1, wherein said mobile station comprises a reception quality measurement unit measuring said second reception quality with removal of a quality deterioration amount due to an interference to said adjacent area, and reports two reception qualities including said second reception quality to said base station;
    and wherein said base station determines the transmission parameter by said second reception quality when the identical resource block as the resource block allocated to said mobile station is not allocated in an area adjacent to an area to which said mobile station is connecting.

3. The wireless communication system according to claim 2, wherein said mobile station reports a reception quality deterioration amount due to an interference to said adjacent area instead of said second reception quality to said base station,
    and said base station determines the transmission parameter by adding a correction based on said quality deterioration amount to a reception quality reported from said mobile station when the identical resource block as the resource block allocated to said mobile station is not allocated in the area adjacent to the area to which said mobile station is connecting.

4. The wireless communication system according to claim 1, wherein said mobile station further comprises a unit for measuring a reception quality of a reference symbol from said adjacent area, and reports two reception qualities including a reception quality of a reference symbol from said adjacent area to said base station,
    and said base station calculates a reception quality with removal of a reception quality deterioration amount due to an interference to said adjacent area by using a reception quality of a reference symbol from said adjacent area, and determines the transmission parameter when the identical resource block as the resource block allocated to said mobile station is not allocated in the area adjacent to the area to which said mobile station is connecting.

5. The wireless communication system according to claim 1, wherein said mobile station selects an area having a largest received power except for the connecting area as said adjacent area.

6. The wireless communication system according to claim 1, wherein said base station comprises a unit for exchanging an allocation state of resource blocks of said adjacent area with other nodes.

7. The wireless communication system according to claim 1, wherein said second method for determining a transmission parameter determines said transmission parameter by adding a correction to the reception quality received from said mobile station with use of handover judgment reception quality information reported from said mobile station.

8. The wireless communication system according to claim 1, wherein said base station performs scheduling not to allocate a resource block to other mobile stations in an adjacent area whose transmission parameter has been determined so that the reception quality reported from said mobile station is improved.

9. A base station, wherein in performing scheduling for determining a resource block allocated to a mobile station, and determining a downlink transmission parameter based on a reception quality reported from said mobile station;
- wherein said base station determines a transmission parameter by a predetermined first method for determining a transmission parameter, when an identical resource block as a resource block allocated to any mobile station is allocated in an area adjacent to an area to which said mobile station is connecting;
- wherein said base station determines a transmission parameter by a second method for determining a transmission parameter which selects a transmission parameter having a transmitting efficiency equal to or greater than a transmitting efficiency by said first method for determining a transmission parameter, when an identical resource block as a resource block allocated to any mobile station is not allocated in an area adjacent to an area to which said mobile station is connecting; and
- wherein said base station calculates a reception quality with removal of a quality deterioration amount in a reception quality due to an interference to said adjacent area by using a ratio of a received power of a reference symbol from said adjacent area and a received power of reference symbols from other areas reported from said mobile station, and determines the transmission parameter, when the identical resource block as the resource block allocated to said mobile station is not allocated in said adjacent area.

10. The base station according to claim 9, wherein said base station receives said second reception quality with removal of a quality deterioration amount due to the interference to said adjacent area from said mobile station; and
- said base station determines the transmission parameter by said second reception quality when the identical resource block as the resource block allocated to said mobile station is not allocated in said adjacent area.

11. The base station according to claim 9, wherein said base station determines the transmission parameter by adding a correction based on a quality deterioration amount in a reception quality due to an interference to said adjacent area reported from said mobile station to a reception quality reported from said mobile station, when the identical resource block as the resource block allocated to said mobile station is not allocated in said adjacent area.

12. The base station according to claim 9, wherein said base station calculates a reception quality with removal of a quality deterioration amount in a reception quality due to an interference to said adjacent area by using a reception quality of a reference symbol from said adjacent area reported from said mobile station, and determines the transmission parameter, when the identical resource block as the resource block allocated to said mobile station is not allocated in said adjacent area.

13. The base station according to claim 9, wherein said mobile station selects an area having a largest received power except for the connecting area as said adjacent area, and
- said base station determines the transmission parameter by a reception quality with removal of a quality deterioration amount in a reception quality due to the interference to said adjacent area when the identical resource block as the resource block allocated to said mobile station is not allocated in said adjacent area.

14. The base station according to claim 9, wherein said base station further comprises means exchanging an allocation state of resource blocks of said adjacent area with other nodes.

15. The base station according to claim 9, wherein said base station improves the reception quality transmitted from said mobile station with use of handover judgment reception quality information reported from said mobile station.

16. The base station according to claim 9, wherein said base station performs scheduling not to allocate a resource block to other mobile stations in an adjacent area whose transmission parameter has been determined so that the reception quality reported from said mobile station is improved.

* * * * *